(12) United States Patent
Rotti et al.

(10) Patent No.: US 10,931,476 B2
(45) Date of Patent: Feb. 23, 2021

(54) CONTENT PROTECTION OVER SYNCHRONOUS DATA NETWORKS

(71) Applicant: Analog Devices Global Unlimited Company, Hamilton (BM)

(72) Inventors: Jagannath Rotti, Bangalore (IN); Harsh Bolia, Udaipur (IN); Prasanna Baja Thirumaleshwara, Kasargod (IN)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 16/586,106

(22) Filed: Sep. 27, 2019

(65) Prior Publication Data

US 2020/0136858 A1    Apr. 30, 2020

Related U.S. Application Data

(60) Provisional application No. 62/843,888, filed on May 6, 2019, provisional application No. 62/752,028, filed on Oct. 29, 2018.

(51) Int. Cl.
*H04L 12/40*    (2006.01)
*H04L 29/06*    (2006.01)
(Continued)

(52) U.S. Cl.
CPC .... *H04L 12/40019* (2013.01); *G06F 13/1689* (2013.01); *G06F 13/405* (2013.01);
(Continued)

(58) Field of Classification Search
CPC ............. G06F 13/1689; G06F 13/4027; G06F 13/405; G06F 13/423; G06F 13/4243; G06F 13/4256; G06F 13/426; G06F 13/4273; G06F 13/4278; G06F 13/4291; G06F 13/4295; G06F 21/60; G06F 21/606; G06F 21/62; H04L 12/40019; H04L 2012/40267; H04L 2012/40273; H04L 63/0464
See application file for complete search history.

(56) References Cited

U.S. PATENT DOCUMENTS 5,819,051 A   10/1998   Murray et al.
7,158,596 B2   1/2007   Knapp et al.
(Continued)

FOREIGN PATENT DOCUMENTS

WO    2013/052886    4/2013

OTHER PUBLICATIONS

"High-bandwidth Digital Content Protection System". Revision 2.2. Intel Corporation. Dec. 21, 2012. (Year: 2012).*
(Continued)

*Primary Examiner* — Thomas J. Cleary
(74) *Attorney, Agent, or Firm* — Patent Capital Group

(57) ABSTRACT

Disclosed herein are systems and techniques for content protection over synchronous data networks. For example, a method of communicating content protected data may include providing link synchronization information over a link of a synchronous bus, and providing content protected data over the link of the synchronous bus. The content protected data may be protected in accordance with the High-Bandwidth Digital Content Protection (HDCP) specification or the Digital Transmission Content Protection (DTCP) specification, for example.

20 Claims, 27 Drawing Sheets

(51) Int. Cl.
*G06F 13/16* (2006.01)
*G06F 21/60* (2013.01)
*G06F 13/40* (2006.01)

(52) U.S. Cl.
CPC ........ *G06F 21/606* (2013.01); *H04L 63/0428* (2013.01); *H04L 63/0464* (2013.01); *H04L 2012/40273* (2013.01)

(56) References Cited

U.S. PATENT DOCUMENTS

| | | | |
|---|---|---|---|
| 7,272,202 B2 | 9/2007 | Knapp et al. | |
| 7,315,551 B2 | 1/2008 | Olson et al. | |
| 7,395,362 B2 | 7/2008 | Drexler et al. | |
| 7,539,804 B2 | 5/2009 | Miura | |
| 7,613,300 B2 | 11/2009 | Kobayashi | |
| 7,685,449 B2 | 3/2010 | Terasawa | |
| 7,707,437 B2 | 4/2010 | Berenbaum et al. | |
| 7,802,036 B2 | 9/2010 | Takeuchi | |
| 7,966,379 B2 | 6/2011 | Berenbaum et al. | |
| 8,147,338 B2 | 4/2012 | Hutchison-Kay | |
| 8,156,274 B2 | 4/2012 | Kapelner | |
| 8,185,759 B1 | 5/2012 | Li et al. | |
| 8,600,583 B2 | 12/2013 | Fervel et al. | |
| 8,615,091 B2 | 12/2013 | Terwal | |
| 8,667,194 B2 | 3/2014 | Dybsetter et al. | |
| 8,745,305 B2 | 6/2014 | Toba et al. | |
| 8,806,083 B2 | 8/2014 | Doorenbos | |
| 8,873,659 B2 | 10/2014 | Wang et al. | |
| 8,987,933 B2 | 3/2015 | Yu | |
| 10,374,583 B1 | 8/2019 | Olejarz et al. | |
| 10,649,945 B1* | 5/2020 | Geerling | G06F 13/4068 |
| 2004/0122490 A1* | 6/2004 | Reinke | A61N 1/37252 607/60 |
| 2006/0125832 A1* | 6/2006 | Mawatari | H04N 5/775 345/501 |
| 2006/0204007 A1* | 9/2006 | Doetzkies | H04N 21/4425 380/221 |
| 2007/0150629 A1* | 6/2007 | Lyle | G06F 13/4045 710/105 |
| 2007/0237332 A1* | 10/2007 | Lyle | H04L 63/0464 380/263 |
| 2008/0289003 A1* | 11/2008 | Bertin | G06F 21/87 726/2 |
| 2009/0296938 A1* | 12/2009 | Devanand | H04L 9/0631 380/278 |
| 2011/0093221 A1* | 4/2011 | Dhanjal | H02J 13/00002 702/57 |
| 2012/0093342 A1 | 4/2012 | Rupprecht et al. | |
| 2013/0124763 A1 | 5/2013 | Kessler | |
| 2013/0148943 A1* | 6/2013 | Velasco | H04N 5/913 386/259 |
| 2013/0200991 A1* | 8/2013 | Ricci | G06F 3/04817 340/4.3 |
| 2013/0212613 A1* | 8/2013 | Velasco | H04N 21/43635 725/25 |
| 2014/0025999 A1 | 1/2014 | Kessler | |
| 2014/0095750 A1 | 4/2014 | Tailliet | |
| 2014/0101351 A1 | 4/2014 | Hooper et al. | |
| 2014/0101477 A1 | 4/2014 | Patterson | |
| 2014/0223054 A1 | 8/2014 | Hasan et al. | |
| 2014/0281077 A1 | 9/2014 | Biskup | |
| 2014/0281078 A1 | 9/2014 | Biskup | |
| 2014/0281079 A1 | 9/2014 | Biskup | |
| 2014/0362865 A1 | 12/2014 | Chini et al. | |
| 2015/0008960 A1 | 1/2015 | Lahr | |
| 2015/0009050 A1 | 1/2015 | Lahr et al. | |
| 2015/0032599 A1 | 1/2015 | Agapitov | |
| 2015/0295903 A1* | 10/2015 | Yi | H04L 9/3263 713/153 |
| 2015/0301968 A1 | 10/2015 | Kessler | |
| 2015/0365754 A1 | 12/2015 | Perl | |
| 2016/0034416 A1 | 2/2016 | Chavez et al. | |
| 2016/0034417 A1 | 2/2016 | Chavez et al. | |
| 2016/0041941 A1 | 2/2016 | Kessler et al. | |
| 2016/0196817 A1 | 7/2016 | Mortensen et al. | |
| 2016/0295221 A1* | 10/2016 | Altmann | H04N 21/42623 |
| 2016/0315766 A1* | 10/2016 | Ujiie | H04L 63/068 |
| 2017/0064370 A1* | 3/2017 | Wang | G09G 5/006 |
| 2017/0134164 A1* | 5/2017 | Haga | G06F 8/65 |
| 2017/0220502 A1 | 8/2017 | Kessler et al. | |
| 2017/0222790 A1 | 8/2017 | Hooper et al. | |
| 2017/0222829 A1 | 8/2017 | Kessler | |
| 2017/0308352 A1 | 10/2017 | Kessler | |
| 2017/0359499 A1* | 12/2017 | Thanigasalam | H04N 5/23245 |
| 2018/0060269 A1 | 3/2018 | Kessler | |
| 2019/0023198 A1* | 1/2019 | Hu | B60R 16/023 |
| 2019/0087377 A1* | 3/2019 | Srivastava | G06F 13/4063 |
| 2019/0173862 A1* | 6/2019 | Kim | H04L 63/062 |
| 2019/0222423 A1* | 7/2019 | Takemori | G07C 5/008 |
| 2019/0260800 A1* | 8/2019 | Shalev | H04L 63/0823 |
| 2019/0306136 A1* | 10/2019 | David | H04W 12/04071 |
| 2019/0330047 A1* | 10/2019 | Joginipelly | B67D 7/106 |
| 2020/0004476 A1* | 1/2020 | Bush | H04L 61/2038 |
| 2020/0021775 A1* | 1/2020 | O'Connell | G08C 15/06 |
| 2020/0044842 A1* | 2/2020 | Usui | H04W 80/02 |
| 2020/0112439 A1* | 4/2020 | Kalaiselvam | H04L 9/3242 |

OTHER PUBLICATIONS

Liu, Jianhui. "Using SN65HVD96 to Create a Power-Over-Data and Polarity Immunity Solution". Application Report SLLA-336. Texas Instruments, Inc. Jan. 2013. (Year: 2013).*
CAN physical layer. CAN in Automation (CiA). Online Oct. 14, 2011. Retrieved from Internet Jun. 5, 2020. <https://web.archive.org/web/20111014023508/https://www.can-cia.org/index.php?id=systemdesign-can-physicallayer>. (Year: 2011).*
MOST Informative, Issue 12, Apr. 2016, 32 pages.
MOST Automotive, Special Issue MOST, Mar. 2012, elektroniknet.de, 52 pages.
MOST Automotive, Microchip, www.microchip.com/wwwproducts/en/OS8119[10/30/2018], 6 pages.
MOST Automotive, Microchip, www.microchip.com/wwwproducts/en/OS82150[10/30/2018], 6 pages.
Unpublished U.S. Appl. No. 16/215,566, filed Dec. 10, 2018.
Unpublished U.S. Appl. No. 16/239,798, filed Jan. 4, 2019.
Unpublished U.S. Appl. No. 16/406,329, filed May 8, 2019.

* cited by examiner

| | STREAM HEADER | | | |
|---|---|---|---|---|
| 1st Frame | Leading 0s (8 bit) | Frame Sequence No. (4 bit) – 0x0 | Stream Counter (4 bit) | Input Counter – MSB (8 bit) |
| 2nd Frame | Leading 0s (8 bit) | Frame Sequence No. (4 bit) – 0x1 | Number of Slots (4 bit) | Input Counter (8 bit) |
| 3rd Frame | Leading 0s (8 bit) | Frame Sequence No. (4 bit) – 0x2 | Encrypted Status (4 bit) | Input Counter (8 bit) |
| 4th Frame | Leading 0s (8 bit) | Frame Sequence No. (4 bit) – 0x3 | Reserved | Input Counter (8 bit) |
| 5th Frame | Leading 0s (8 bit) | Frame Sequence No. (4 bit) – 0x4 | Reserved | Input Counter (8 bit) |
| 6th Frame | Leading 0s (8 bit) | Frame Sequence No. (4 bit) – 0x5 | Reserved | Input Counter (8 bit) |
| 7th Frame | Leading 0s (8 bit) | Frame Sequence No. (4 bit) – 0x6 | Reserved | Input Counter (8 bit) |
| 8th Frame | Leading 0s (8 bit) | Frame Sequence No. (4 bit) – 0x7 | Reserved | Input Counter - LSB (8 bit) |
| ... | ... | ... | ... | ... |
| 15th Frame | Leading 0s (8 bit) | Frame Sequence No. (4 bit) – 0xE | Reserved | Reserved |
| 16th Frame | Leading 0s (8 bit) | Frame Sequence No. (4 bit) – 0xF | Reserved | Reserved |

TIME →

FIG. 18

| | AKE (SOURCE TO SINK) + LINK SYNCHRONIZATION | | | AKE (SINK TO SOURCE) + LINK INTEGRITY |
|---|---|---|---|---|
| 1st Frame | Frame Sequence No. (4 bit) – 0x0 | Input Counter MSB, higher nibble (4 bit) | Trailing 0s (0-16 bit) | |
| 2nd Frame | Frame Sequence No. (4 bit) – 0x1 | Input Counter MSB, lower nibble (4 bit) | Trailing 0s (0-16 bit) | |
| 3rd Frame | Frame Sequence No. (4 bit) – 0x2 | Input Counter LSB, higher nibble (4 bit) | Trailing 0s (0-16 bit) | |
| 4th Frame | Frame Sequence No. (4 bit) – 0x3 | Input Counter LSB, lower nibble (4 bit) | Trailing 0s (0-16 bit) | |
| 5th Frame | Frame Sequence No. (4 bit) – 0x4 | Encrypted Status (4 bit) | Trailing 0s (0-16 bit) | AKE + custom messaging (using data pipe instances) (8 bit) |
| 6th Frame | Frame Sequence No. (4 bit) – 0x5 | Reserved (Future Expansion – Stream Counter) | Trailing 0s (0-16 bit) | |
| 7th Frame | Frame Sequence No. (4 bit) – 0x6 | Reserved (Future Expansion – Number of slots) | Trailing 0s (0-16 bit) | |
| 8th Frame | Frame Sequence No. (4 bit) – 0x7 | Reserved | Trailing 0s (0-16 bit) | |
| ⋮ | ⋮ | ⋮ | | AKE + custom messaging (using data pipe instances) (8 bit) |
| 15th Frame | Frame Sequence No. (4 bit) – 0xE | Reserved | Trailing 0s (0-16 bit) | |
| 16th Frame | Frame Sequence No. (4 bit) – 0xF | Reserved | Trailing 0s (0-16 bit) | |

FIG. 24

| | AKE (SOURCE TO SINK) + LINK SYNCHRONIZATION | | | AKE (SINK TO SOURCE) + LINK INTEGRITY |
|---|---|---|---|---|
| 1st Frame | Frame Sequence No. (4 bit) – 0x0 | Input Counter MSB, higher nibble (4 bit) | DTCP_USER_INFO (8 bit) | Trailing 0s (0-16 bit) |
| 2nd Frame | Frame Sequence No. (4 bit) – 0x1 | Input Counter MSB, lower nibble (4 bit) | DTCP_USER_INFO (8 bit) | Trailing 0s (0-16 bit) |
| 3rd Frame | Frame Sequence No. (4 bit) – 0x2 | Input Counter LSB, higher nibble (4 bit) | DTCP_USER_INFO (8 bit) | Trailing 0s (0-16 bit) |
| 4th Frame | Frame Sequence No. (4 bit) – 0x3 | Input Counter LSB, lower nibble (4 bit) | DTCP_USER_INFO (8 bit) | Trailing 0s (0-16 bit) |
| 5th Frame | Frame Sequence No. (4 bit) – 0x4 | Encrypted Status (4 bit) | DTCP_USER_INFO (8 bit) | Trailing 0s (0-16 bit) |
| 6th Frame | Frame Sequence No. (4 bit) – 0x5 | Reserved (Future Expansion – Stream Counter) | DTCP_USER_INFO (8 bit) | Trailing 0s (0-16 bit) |
| 7th Frame | Frame Sequence No. (4 bit) – 0x6 | Reserved (Future Expansion – Number of slots) | DTCP_USER_INFO (8 bit) | Trailing 0s (0-16 bit) |
| 8th Frame | Frame Sequence No. (4 bit) – 0x7 | DTCP Information (4 bit) | DTCP_USER_INFO (8 bit) | Trailing 0s (0-16 bit) |
| ... | AKE + custom messaging (using data pipe instances) (8 bit) | ... | ... | AKE + custom messaging (using data pipe instances) (8 bit) |
| 15th Frame | Frame Sequence No. (4 bit) – 0xE | RESERVED | RESERVED | Trailing 0s (0-16 bit) |
| 16th Frame | Frame Sequence No. (4 bit) – 0xF | RESERVED | RESERVED | Trailing 0s (0-16 bit) |

FIG. 25

| | | | | | | |
|---|---|---|---|---|---|---|
| dtcp_user_info1 | Protocol_Version (0x02) | | | | | |
| dtcp_user_info2 | DOT_CCI | RCT_CCI | ICT_CCI | APS_CCI | RESERVED | EMI_CCI |
| dtcp_user_info3 | RL_CCI | | | | | |
| dtcp_user_info4 | RESERVED | | | | | |
| dtcp_user_info5 | | | | | | |
| dtcp_user_info6 | | | | | | |
| dtcp_user_info7 | | | | | | |
| dtcp_user_info8 | | | | | | |

EMI = Encryption Mode Indicator
APS = Analog Copy Protection System
ICT = Image Constraint Trigger/Token
RCT = Redistribution Control Trigger
DOT = Digital Only Token
RL = Retention Limit (default = 90 minutes)
CCI = Copy Control Information

FIG. 26

CONTENT PROTECTION OVER SYNCHRONOUS DATA NETWORKS

CROSS-REFERENCE TO RELATED APPLICATIONS

This application claims priority to U.S. Provisional Patent Application No. 62/752,028, filed on Oct. 29, 2018 and titled "CONTENT PROTECTION OVER SYNCHRONOUS DATA NETWORKS," and also claims priority to U.S. Provisional Patent Application No. 62/843,888, filed on May 6, 2019 and titled "CONTENT PROTECTION OVER SYNCHRONOUS DATA NETWORKS." Both of these priority applications are incorporated by reference herein in their entireties.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 18 illustrates example stream headers that may be used to transmit CP content, in accordance with various embodiments.

FIGS. 24 and 25 illustrate frame formats that may be used for CP content transmission, in accordance with various embodiments.

FIG. 26 illustrates an example mapping from CI+ URI to USER_INFO bytes, in accordance with various embodiments.

DETAILED DESCRIPTION

Disclosed herein are systems and techniques for sending content protected digital data (e.g., digital audio) over synchronous data networks (SDNs).

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality.

Figure 1:
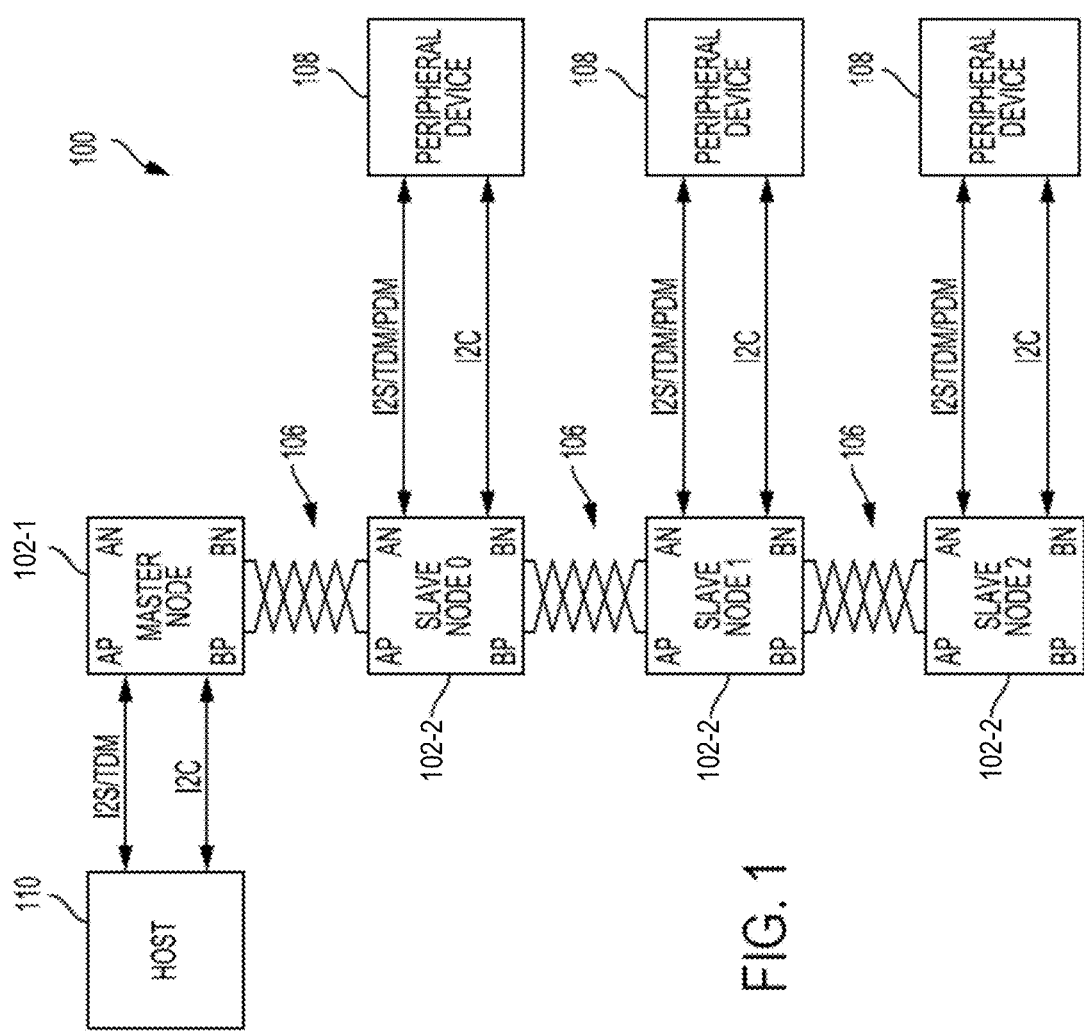
FIG. 1 is a block diagram of an illustrative two-wire communication system, in accordance with various embodiments.

FIG. 1 is a block diagram of an illustrative half-duplex two-wire communication system 100, in accordance with various embodiments. The system 100 includes a host 110, a master node 102-1 and at least one slave node 102-2. In FIG. 1, three slave nodes (0, 1, and 2) are illustrated. The depiction of three slave nodes 102-2 in FIG. 1 is simply illustrative, and the system 100 may include one, two, or more slave nodes 102-2, as desired. As discussed further below, the system 100 is an example of an SDN.

The master node 102-1 may communicate with the slave nodes 102-2 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102-1 to the slave node 0, a link coupling the slave node 0 to the slave node 1, and a link coupling the slave node 1 to the slave node 2. In some embodiments, the links of the bus 106 may each be formed of a single twisted wire pair (e.g., an unshielded twisted pair). In some embodiments, the links of the bus 106 may each be formed of a coax cable (e.g., with the core providing the "positive" line and the shield providing the "negative" line, or vice versa). The two-wire bus links together provide a complete electrical path (e.g., a forward and a return current path) so that no additional ground or voltage source lines are used. The bus 106 may support content protection between the master node 102-1 and a slave node 102-2, and/or between multiple slave nodes 102-2, in accordance with any of the embodiments disclosed herein.

The master node 102-1 may include one or more transceivers for communication over the bus 106 (as discussed below), and content protection circuitry. The content protection circuitry may perform any of the content protection operations disclosed herein (e.g., decryption, encryption, providing relevant supporting data to the transceiver(s), etc.). In some embodiments, the transceiver(s) of the master node 102-1 may be included in a single die, and the content protection circuitry may be included in a different die; in some such embodiments, the different dies may be included in a single multi-chip package (MCP) in the master node 102-1. In other embodiments, the transceiver(s) of the master node 102-1 and the content protection circuitry may be included in a single die, or distributed across more than two dies packaged in any desired manner.

A slave node 102-2 may include one or more transceivers for communication over the bus 106 (as discussed below), and content protection circuitry. The content protection circuitry may perform any of the content protection operations disclosed herein (e.g., decryption, encryption, providing relevant supporting data to the transceiver(s), etc.). In some embodiments, the transceiver(s) of the slave node 102-2 may be included in a single die, and the content protection circuitry may be included in a different die; in some such embodiments, the different dies may be included in a single MCP in the slave node 102-2. In other embodiments, the transceiver(s) of the slave node 102-2 and the content protection circuitry may be included in a single die, or distributed across more than two dies packaged in any desired manner.

The host 110 may include a processor that programs the master node 102-1, and acts as the originator and recipient of various payloads transmitted along the bus 106. In some embodiments, the host 110 may be or may include a microcontroller, for example. In particular, the host 110 may be the master of Inter-Integrated Circuit Sound (I2S) communications that happen along the bus 106. The host 110 may communicate with the master node 102-1 via an I2S/Time Division Multiplex (TDM) bus and/or an Inter-Integrated Circuit (I2C) bus. In some embodiments, communications between the host 110 and the master node 102-1 may not be encrypted; instead, these communications may be protected from unauthorized access by embedding the relevant bus lines between layers of a printed circuit board (PCB), or otherwise making physical access difficult. In some embodiments, the master node 102-1 may be a transceiver (e.g., the node transceiver 120 discussed below with reference to FIG. 2) located within a same housing as the host 110. The master node 102-1 may be programmable by the host 110 over the I2C bus for configuration and read-back, and may be configured to generate clock, synchronization, and framing for all of the slave nodes 102-2. In some embodiments, an extension of the I2C control bus between the host 110 in the master node 102-1 may be embedded in the data streams transmitted over the bus 106, allowing the host 110 direct access to registers and status information for the one or more slave nodes 102-2, as well as enabling I2C-to-I2C communication over distance to allow the host 110 to control the peripheral devices 108. In some embodiments, the data provided by the host 110 to the master node may include high-definition digital media content (e.g., audio and/or video), and that high-definition content may be protected as it is transmitted via the bus 106 in accordance with any of the content protection techniques disclosed herein.

The master node 102-1 may generate "downstream" signals (e.g., data signals, power signals, etc., transmitted away from the master node 102-1 along the bus 106) and receive "upstream" signals (e.g., transmitted toward the master node 102-1 along the bus 106). The master node 102-1 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102-1 may be derived from an I2S input provided to the master node 102-1 by the host 110. A slave node 102-2 may be an addressable network connection point that represents a possible destination for data frames transmitted downstream on the bus 106 or upstream on the bus 106. A slave node 102-2 may also represent a possible source of downstream or upstream data frames. The system 100 may allow for control information and other data to be transmitted in both directions over the bus 106 from one node to the next. One or more of the slave nodes 102-2 may also be powered by signals transmitted over the bus 106.

In particular, each of the master node 102-1 and the slave nodes 102-2 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102-1 may include positive and negative upstream terminals, but these terminals may not be used; in other embodiments, the master node 102-1 may not include positive and negative upstream terminals. The last slave node 102-2 along the bus 106 (the slave node 2 in FIG. 1) may include positive and negative downstream terminals, but these terminals may not be used; in other embodiments, the last slave node 102-2 along the bus may not include positive and negative downstream terminals.

As discussed in detail below, the master node 102-1 may periodically send a synchronization control frame downstream, optionally along with data intended for one or more of the slave nodes 102-2. For example, the master node 102-1 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 102-2 to identify the beginning of each superframe and also, in combination with physical layer encoding/signaling, may allow each slave node 102-2 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 102-2), conveyance of I2C information, remote control of certain general-purpose input/output (GPIO) pins at the slave nodes 102-2, and other services. A portion of the synchronization control frame following the preamble and the payload data may be scrambled to reduce the likelihood that information in the synchronization control frame will be mistaken for a new preamble, and to flatten the spectrum of related electromagnetic emissions.

The synchronization control frame may get passed between slave node 102-2 (optionally along with other data, which may come from the master node 102-1 but additionally or alternatively may come from one or more upstream slave nodes 102-2 or from a slave node 102-2 itself) until it reaches the last slave node 102-2 (i.e., the slave node 2 in FIG. 1), which has been configured by the master node 102-1 as the last slave node 102-2 or has self-identified itself as the last slave node 102-2. Upon receiving the synchronization control frame, the last slave node 102-2 may transmit a synchronization response frame followed by any data that it is permitted to transmit (e.g., a 24-bit audio sample in a designated time slot). The synchronization response frame may be passed upstream between slave nodes 102-2 (optionally along with data from downstream slave nodes 102-2), and based on the synchronization response frame, each slave node 102-2 may be able to identify a time slot, if any, in which the slave node 102-2 is permitted to transmit.

In some embodiments, one or more of the slave nodes 102-2 in the system 100 may be coupled to and communicate with a peripheral device 108. For example, a slave node 102-2 may be configured to read data from and/or write data to the associated peripheral device 108 using I2S, pulse density modulation (PDM), TDM, and/or I2C protocols, as discussed below. In some embodiments, the data communicated between the slave nodes 102-2 and their associated peripheral devices 108 may not be encrypted; instead, these communications may be protected from unauthorized access by embedding the relevant bus lines between layers of a PCB, or otherwise making physical access difficult. Although the "peripheral device 108" may be referred to in the singular herein, this is simply for ease of discussion, and a single slave node 102-2 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for I2S communication; the peripheral device 108 may communicate with the associated slave node 102-2 via the I2S protocol. In some embodiments, the peripheral device 108 may include any device configured for I2C communication; the peripheral device 108 may communicate with the associated slave node 102-2 via the I2C protocol. In some embodiments, a slave node 102-2 may not be coupled to any peripheral device 108.

A slave node 102-2 and its associated peripheral device 108 may be contained in separate housings and coupled through a wired or wireless communication connection or may be contained in a common housing. For example, a speaker connected as a peripheral device 108 may be packaged with the hardware for an associated slave node 102-2 (e.g., the node transceiver 120 discussed below with reference to FIG. 2), such that the hardware for the associated slave node 102-2 is contained within a housing that includes other speaker components. The same may be true for any type of peripheral device 108.

As discussed above, the host 110 may communicate with and control the master node 102-1 using multi-channel I2S and I2C communication protocols. For example, the host 110 may transmit data via I2S to a frame buffer (not illustrated) in the master node 102-1, and the master node 102-1 may read data from the frame buffer and transmit the data along the bus 106. Analogously, the master node 102-1 may store data received via the bus 106 in the frame buffer, and then may transmit the data to the host 110 via I2S.

Each slave node 102-2 may have internal control registers that may be configured by communications from the master node 102-1. A number of such registers are discussed in detail below. Each slave node 102-2 may receive downstream data and may retransmit the data further downstream. Each slave node 102-2 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102-1 may be programmed (by the host 110) with a number of downstream portions to transmit to one or more of the slave nodes 102-2 and a number of upstream portions to receive from one or more of the slave nodes 102-2. Each slave node 102-2 may be programmed (by the master node 102-1) with a number of downstream portions to retransmit down the bus 106, a number of downstream portions to consume, a number of upstream portions to retransmit up the bus 106, and a number of upstream portions in which the slave node 102-2 may transmit data received from the slave node 102-2 from the associated peripheral device 108. Communication along the bus 106 is discussed in further detail below with reference to FIGS. 2-12. Further, Appendix I and Appendix II discuss a number of embodiments of content protection techniques that may be implemented to protect communication along the bus 106.

Figure 2:
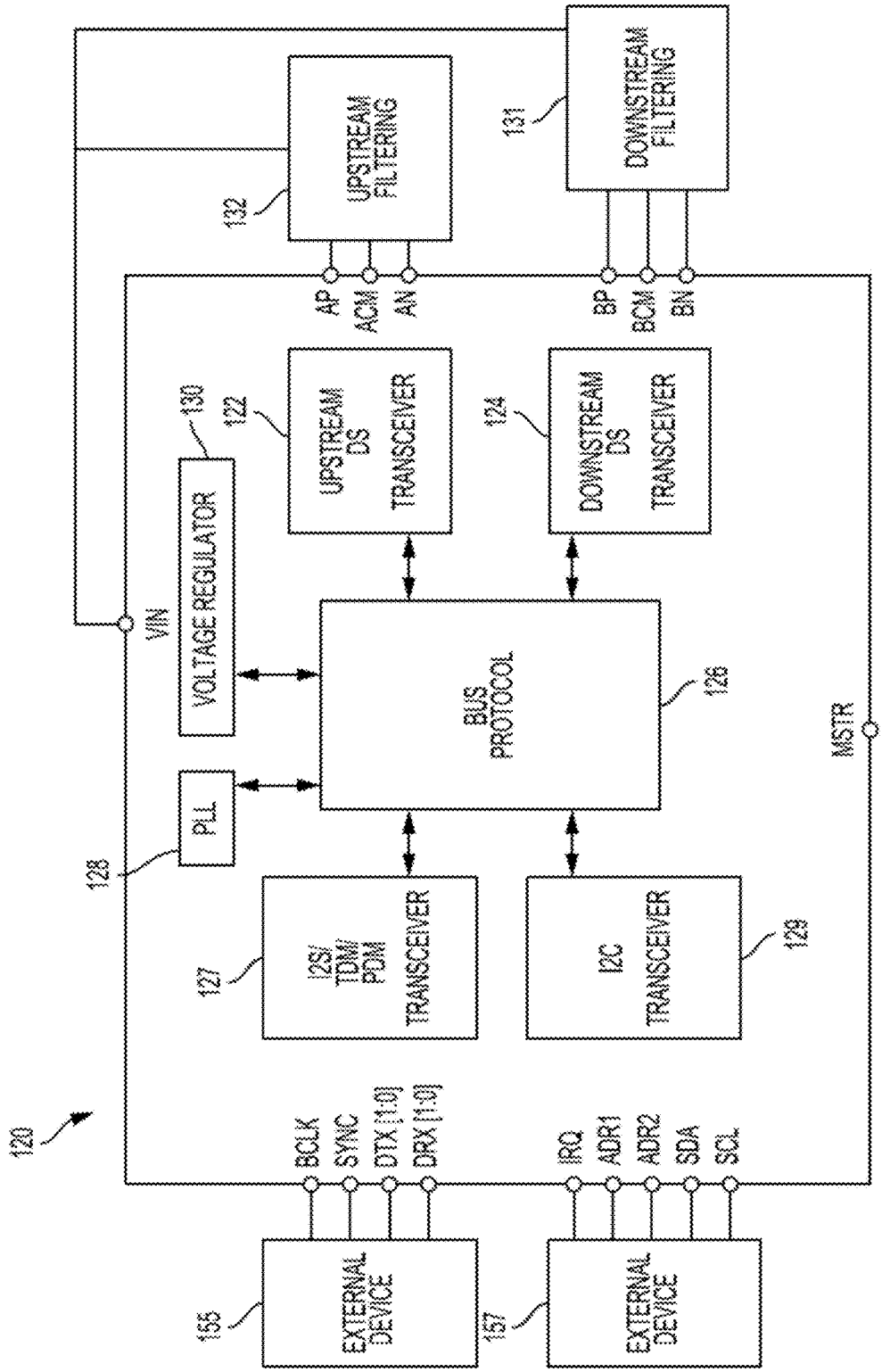
FIG. 2 is a block diagram of a node transceiver that may be included in a node of the system of FIG. 1, in accordance with various embodiments.

Each of the master node 102-1 and the slave nodes 102-2 may include a transceiver to manage communication between components of the system 100. FIG. 2 is a block diagram of a node transceiver 120 that may be included in a node (e.g., the master node 102-1 or a slave node 102-2) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 102-2 in the system 100 may receive power transmitted over the bus 106 concurrently with data. For power distribution (which is optional, as some of the slave nodes 102-2 may be configured to have exclusively local power provided to them), the master node 102-1 may place a DC bias on the bus link between the master node 102-1 and the slave node 0 (e.g., by connecting, through a low-pass filter, one of the downstream terminals to a voltage source provided by a voltage regulator and the other downstream terminal to ground). The DC bias may be a predetermined voltage, such as 5 volts, 8 volts, the voltage of a car battery, or a higher voltage. Each successive slave node 102-2 can selectively tap its upstream bus link to recover power (e.g., using the voltage regulator circuitry 130). This power may be used to power the slave node 102-2 itself (and optionally one or more peripheral device 108 coupled to the slave node 102-2). A slave node 102-2 may also selectively bias the bus link downstream for the next-in-line slave node 102-2 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102-1 may instruct the slave node 0 to provide power to its downstream bus link 106 to provide power to the slave node 1; after the slave node 1 is discovered and configured, the master node 102-1 may instruct the slave node 1 to provide power to its downstream bus link 106 to provide power to the slave node 2 (and so on for additional slave nodes 102-2 coupled to the bus 106). In some embodiments, one or more of the slave nodes 102-2 may be locally powered, instead of or in addition to being powered from its upstream bus link. In some such embodiments, the local power source for a given slave node 102-2 may be used to provide power to one or more downstream slave nodes.

In some embodiments, upstream filtering circuitry 132 may be disposed between the upstream DS transceiver 122 and the voltage regulator circuitry 130, and downstream filtering circuitry 131 may be disposed between the downstream DS transceiver 124 and the voltage regulator circuitry 130. Since each link of the bus 106 may carry AC (signal) and DC (power) components, the upstream filtering circuitry 132 and the downstream filtering circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the transceivers 122 and 124 from the DC component on the line to allow for high speed bi-directional communications. As discussed above, the DC component may be tapped for power, and the upstream filtering circuitry 132 and the downstream filtering circuitry 131 may include a ferrite, a common mode choke, or an inductor, for example, to reduce the AC component provided to the voltage regulator circuitry 130. In some embodiments, the upstream filtering circuitry 132 may be included in the upstream DS transceiver 122, and/or the downstream filtering circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a PCB). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102-1, the external device 155 may include the host 110, and the I2S/TDM/PDM transceiver 127 may provide an I2S slave (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 102-2, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDM MODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102-1), and SDA and SCL are used for the I2C serial data and serial clock signals, respectively. When the node transceiver 120 is included in the master node 102-1, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 102-2, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102-1, the bus protocol circuitry 126 may provide event-driven interrupt requests toward the host 110 via the IRQ pin. When the node transceiver 120 is included in a slave node 102-2 (e.g., when the MSTR pin is low), the IRQ pin may serve as a GPIO pin with interrupt request capability.

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PAs of each node (e.g., the PLL 128) synchronized. In standby operational mode, reads and writes across the bus 106 are not supported. In a discovery operational mode, the master node 102-1 may send predetermined signals out along the bus 106 and wait for suitable responses to map out the topology of slave nodes 102-2 distributed along the bus 106. In a normal operational mode, full register access may be available to and from the slave nodes 102-2 as well as access to and from peripheral devices 108 over the bus 106. Normal mode may be globally configured by the host 110 with or without synchronous upstream data and with or without synchronous downstream data.

Figure 3:
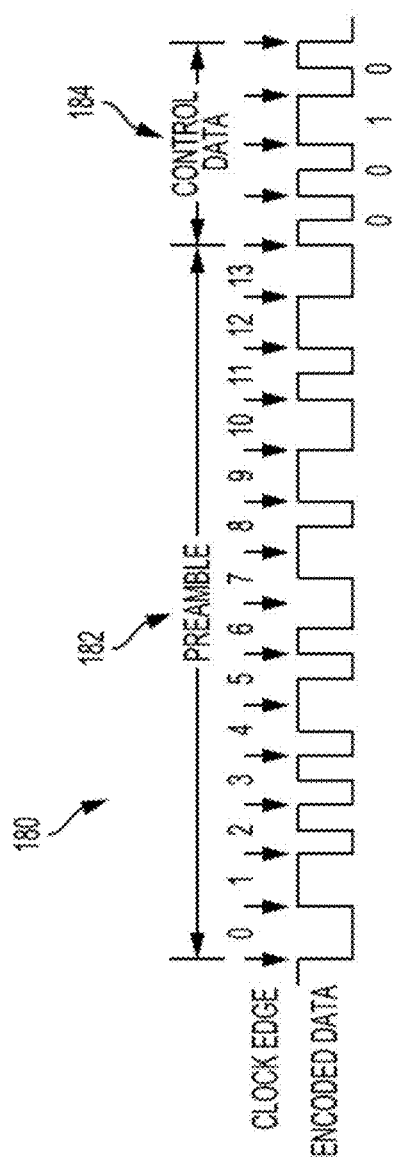
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102-1, while in an upstream portion, a synchronization response frame, and upstream data may be transmitted to the master node 102-1 from each of the slave nodes 102-2. The synchronization control frame 180 may include a preamble 182 and control data 184. Each slave node 102-2 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
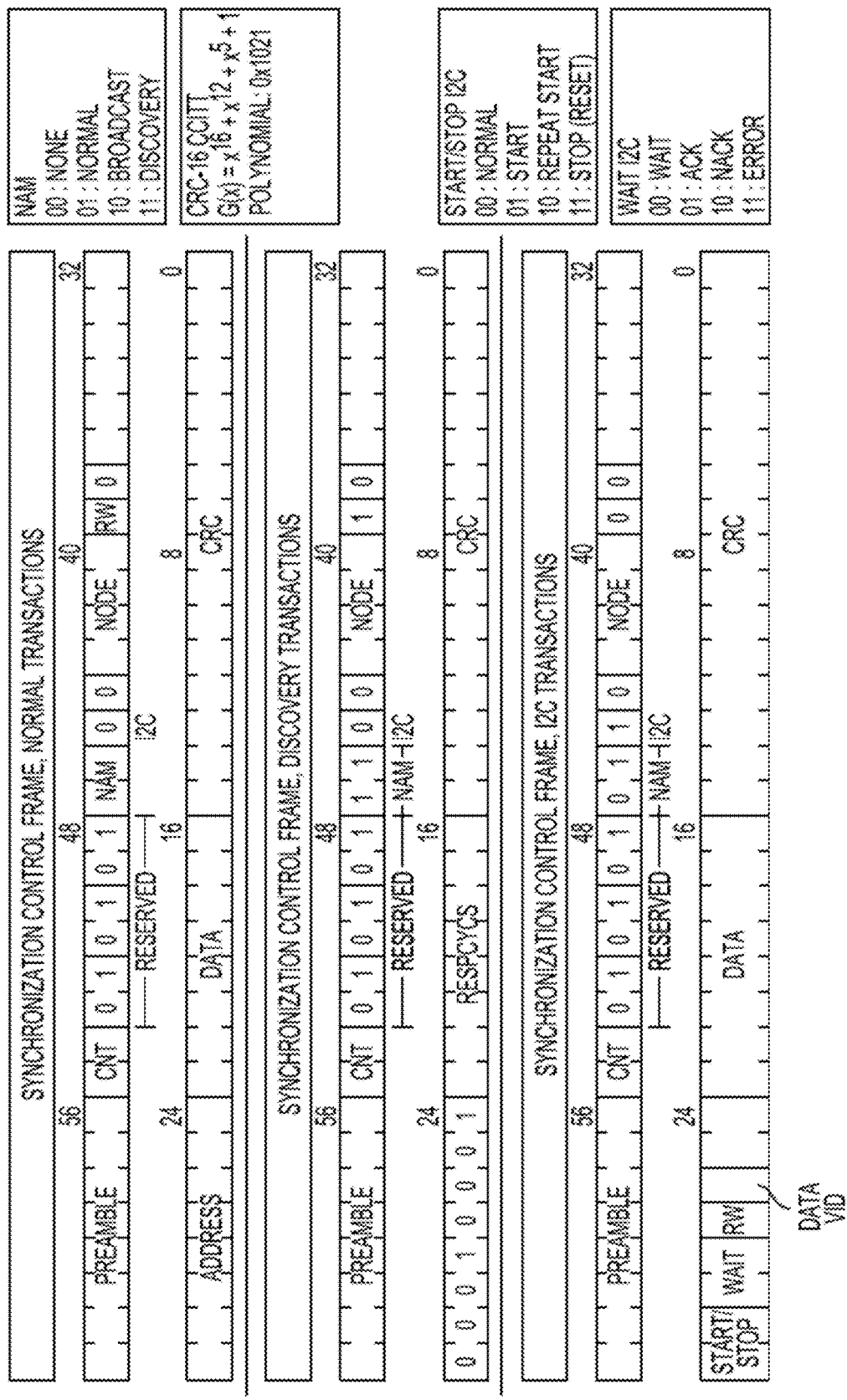
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 102-2 can receive a PLL synchronization signal from the bus 106 without requiring a crystal clock source at the slave nodes 102-2.

Figure 4:
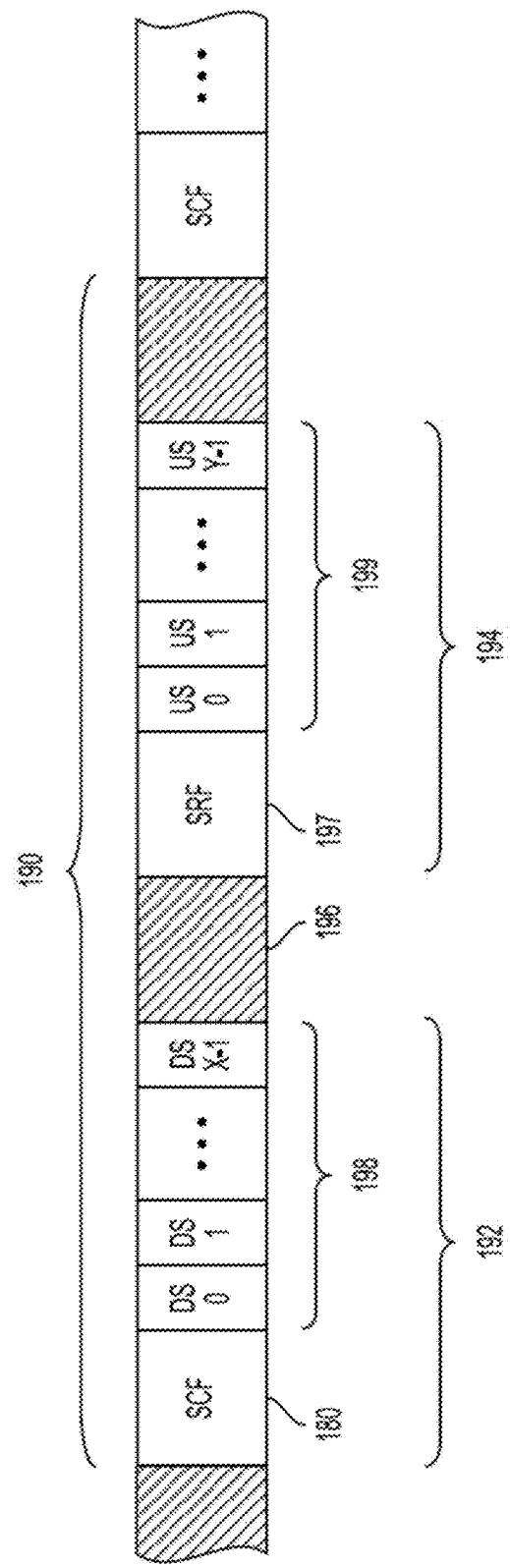
FIG. 4 is a diagram of a superframe used for communication in the system of FIG. 1, in accordance with various embodiments.
Figure 6:
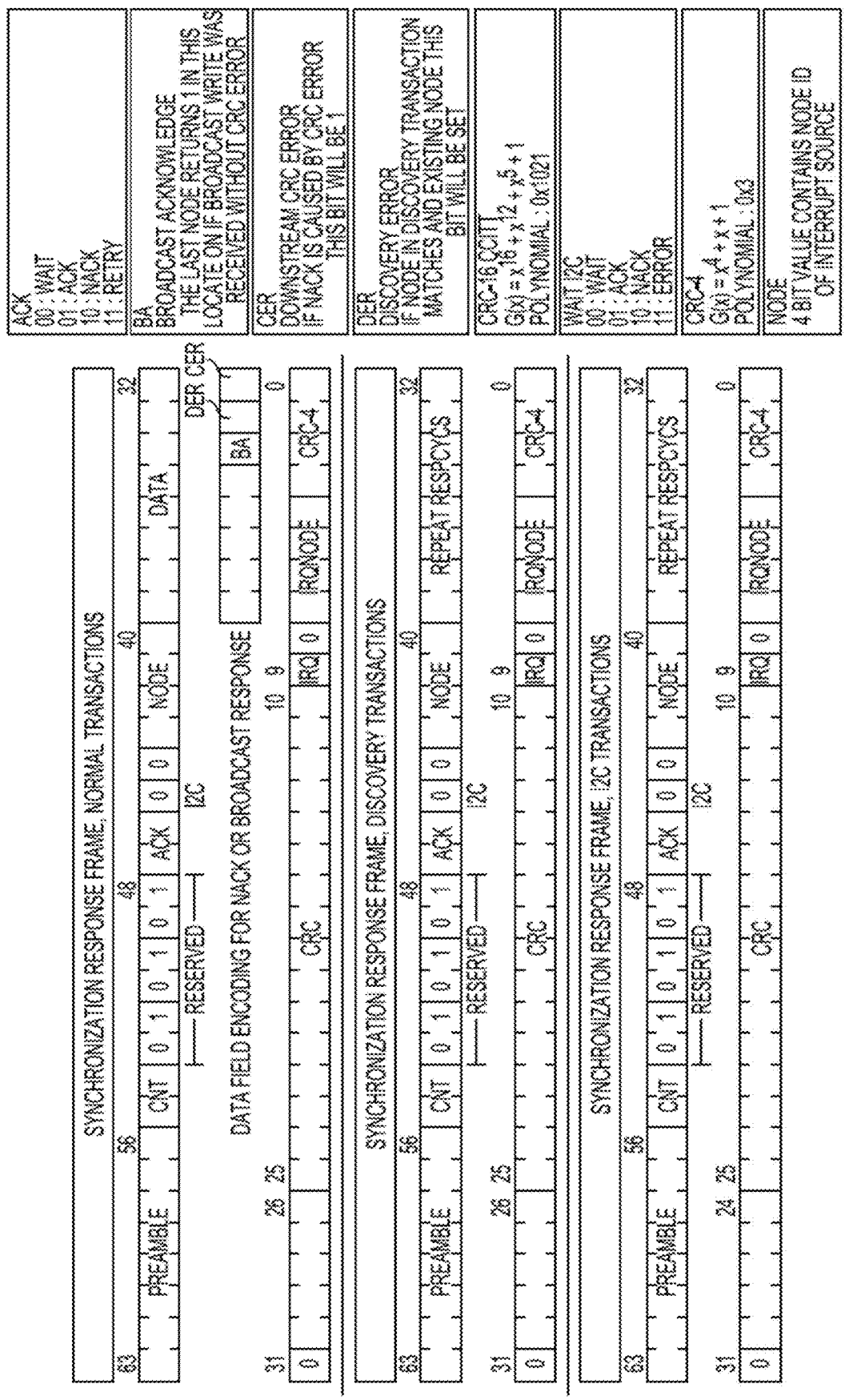
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102-1 to the last slave node 102-2 in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 102-2 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 102-2 in the upstream data slots 199 directly after the synchronization response frame 197. The upstream data slots 199 may have equal width. A slave node 102-2 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 102-2 to a downstream slave node 102-2, the preamble 182 may be generated by the transmitting slave node 102-2, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 102-2 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 102-2 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 102-2 over the bus 106. In normal mode, registers of a slave node 102-2 may be read from and/or written to based on the ID of the slave node 102-2 and the address of the register. Broadcast transactions are writes which should be taken by every slave node 102-2. In some embodiments, the NAM field may provide for four node addressing modes, including "none" (e.g., data not addressed to any particular slave node 102-2), "normal" (e.g., data unicast to a specific slave node 102-2 specified in the address field discussed below), "broadcast" (e.g., addressed to all slave nodes 102-2), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 102-2.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 102-2 in a node ID register of the slave node 102-2. Each slave node 102-2 in the system 100 may be assigned a unique ID when the slave node 102-2 is discovered by the master node 102-1, as discussed below. In some embodiments, the master node 102-1 does not have a node ID, while in other embodiments, the master node 102-1 may have a node ID. In some embodiments, the slave node 102-2 attached to the master node 102-1 on the bus 106 (e.g., the slave node 0 in FIG. 1) will be slave node 0, and each successive slave node 102-2 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW==1) or writes (e.g., RW==0).

In some embodiments, the synchronization control frame 180 may include an address field. The address field may have any suitable length (e.g., 8 bits) and may be used to address specific registers of a slave node 102-2 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 102-2 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled to reduce the likelihood that a sequence of bits in this interval will periodically match the preamble 182 (and thus may be misinterpreted by the slave node 102-2 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 102-2 or to reduce the likelihood that the preamble 182 shows up elsewhere in the synchronization control frame 180, in addition to or in lieu of techniques such as scrambling and/or error encoding as discussed above. For example, a longer synchronization sequence may be used to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102-1 may send read and write requests to the slave nodes 102-2, including both requests specific to communication on the bus 106 and I2C requests. For example, the master node 102-1 may send read and write requests (indicated using the RW field) to one or more designated slave nodes 102-2 (using the NAM and node fields) and can indicate whether the request is a request for the slave node 102-2 specific to the bus 106, an I2C request for the slave node 102-2, or an I2C request to be passed along to an I2C-compatible peripheral device 108 coupled to the slave node 102-2 at one or more I2C ports of the slave node 102-2.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 102-2 on the bus 106 may wait until the RESPCYCS counter has expired and then begin transmitting a synchronization response frame 197 upstream. If an upstream slave node 102-2 has been targeted by a normal read or write transaction, a slave node 102-2 may generate its own synchronization response frame 197 and replace the one received from downstream. If any slave node 102-2 does not see a synchronization response frame 197 from a downstream slave node 102-2 at the expected time, the slave node 102-2 will generate its own synchronization response frame 197 and begin transmitting it upstream.

The data portion of the synchronization response frame 197 may include fields that contain data used to communicate response information back to the master node 102-1. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 102-2 to acknowledge a command received in the previous synchronization control frame 180 when that slave node 102-2 generates the synchronization response frame 197. Example indicators that may be communicated in the ACK field include wait, acknowledge, not acknowledge (NACK), and retry. In some embodiments, the ACK field may be sized to transmit an acknowledgment by a slave node 102-2 that it has received and processed a broadcast message (e.g., by transmitting a broadcast acknowledgment to the master node 102-1). In some such embodiments, a slave node 102-2 also may indicate whether the slave node 102-2 has data to transmit (which could be used, for example, for demand-based upstream transmissions, such as non-TDM inputs from a keypad or touchscreen, or for prioritized upstream transmission, such as when the slave node 102-2 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 102-2 that generates the synchronization response frame 197.

In some embodiments, the synchronization response frame 197 may include a data field. The data field may have any suitable length (e.g., 8 bits), and its value may depend on the type of transaction and the ACK response of the slave node 102-2 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 102-2 may indicate if the broadcast write was received without error), a discovery error (DER) indicator (indicating whether a newly discovered slave node 102-2 in a discovery transaction matches an existing slave node 102-2), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 102-2.

In some embodiments, the synchronization response frame 197 may include an IRQ node (IRQNODE) field. The IRQNODE field may have any suitable length (e.g., 4 bits) and may be used to transmit the ID of the slave node 102-2 that has signaled the interrupt presented by the IRQ field. In some embodiments, the slave node 102-2 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 102-2 that needs to signal an interrupt to the master node 102-1 will insert its interrupt information into these fields. In some embodiments, a slave node 102-2 with an interrupt pending may have higher priority than any slave node 102-2 further downstream that also has an interrupt pending. The last slave node 102-2 along the bus 106 (e.g., the slave node 2 in FIG. 1) may always populate these interrupt fields. If the last slave node 102-2 has no interrupt pending, the last slave node 102-2 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 102-2 or to reduce the likelihood that the preamble 182 shows up elsewhere in the synchronization response frame 197, in addition to or in lieu of techniques such as scrambling and/or error encoding as discussed above. For example, a longer synchronization sequence may be used to reduce the likelihood that a particular encoding of the remainder of the synchronization response frame 197 will match it. Additionally or alternatively, the remainder of the synchronization response frame may be structured so that the synchronization sequence cannot occur, such as by placing fixed "0" or "1" values at appropriate bits.

Figure 7:
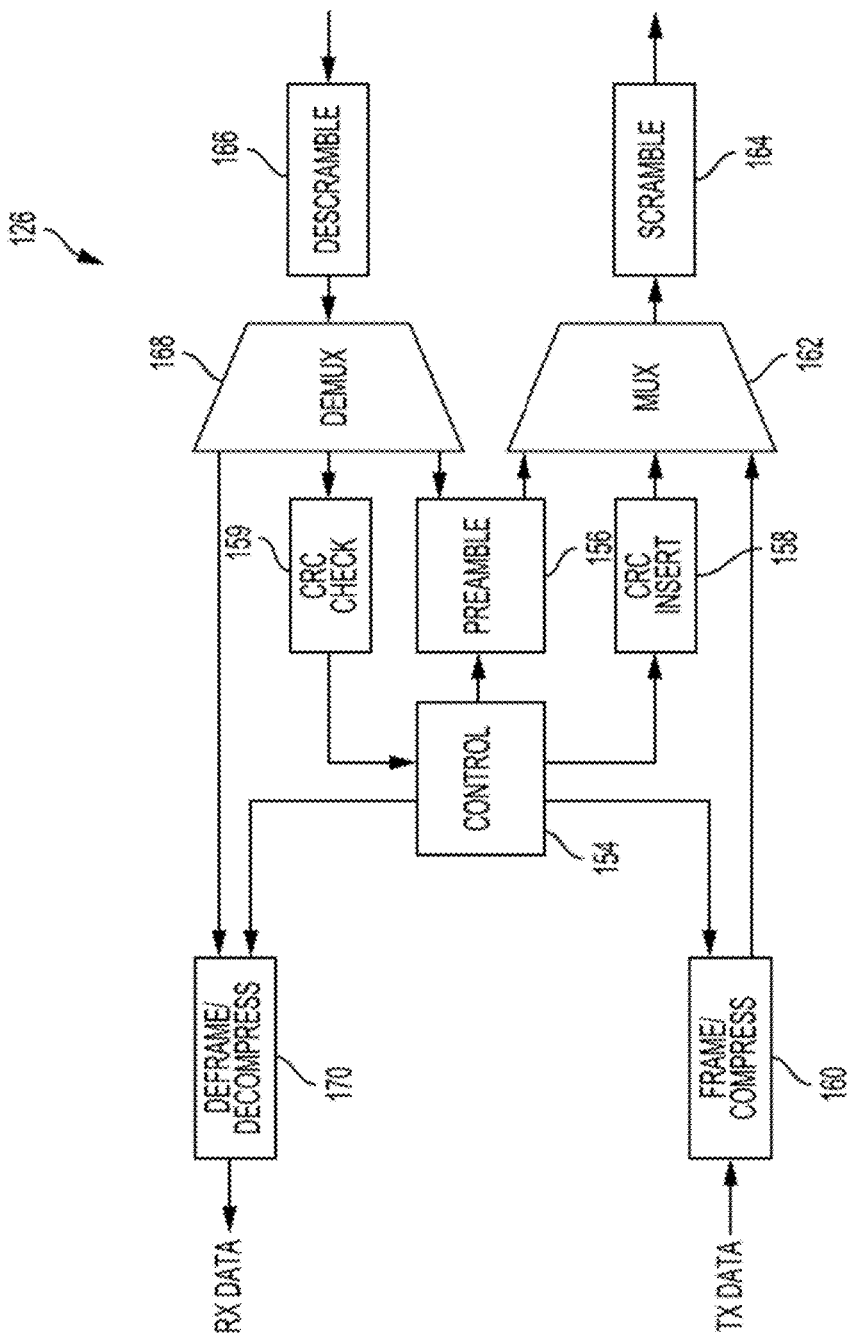
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 102-2 or from an I2C device when the bus protocol circuitry 126 is included in a master node 102-1), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102-1 every 1024 bits. As discussed above, one or more slave nodes 102-2 may synchronize to the downstream synchronization control frame preamble and generate local, phase-aligned master clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the master node 102-1 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102-1, the values in these registers may be programmed into the control circuitry 154 by the host 110. When the control circuitry 154 is included in a slave node 102-2, the values in these registers may be programmed into the control circuitry 154 by the master node 102-1.

In some embodiments, the control circuitry 154 may include a downstream slots (DNSLOTS) register. When the node transceiver 120 is included in the master node 102-1, this register may hold the value of the total number of downstream data slots. This register may also define the number of data slots that will be used for combined I2S/TDM/PDM receive by the I2S/TDM/PDM transceiver 127 in the master node 102-1. In a slave node 102-2, this register may define the number of data slots that are passed downstream to the next slave node 102-2 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102-1. In a slave node 102-2, this register may define the number of data slots that the slave node 102-2 will use and not retransmit. Alternatively, this register may define the number of slots that the slave node 102-2 may contribute to the downstream bus link 106.

In some embodiments, the control circuitry 154 may include an upstream slots (UPSLOTS) register. In the master node 102-1, this register may hold the value of the total number of upstream data slots. This register may also define the number of slots that will be used for I2S/TDM transmit by the I2S/TDM/PDM transceiver 127 in the master node 102-1. In a slave node 102-2, this register may define the number of data slots that are passed upstream before the slave node 102-2 begins to add its own data.

In some embodiments, the control circuitry 154 may include a local upstream slots (LUPSLOTS) register. This register may be unused in the master node 102-1. In a slave node 102-2, this register may define the number of data slots that the slave node 102-2 will add to the data received from downstream before it is sent upstream. This register may also define the number of data slots that will be used for combined I2S/TDM/PDM receive by the I2S/TDM/PDM transceiver 127 in the slave node 102-2.

In some embodiments, the control circuitry 154 may include a broadcast downstream slots (BCDNSLOTS) register. This register may be unused in the master node 102-1. In a slave node 102-2, this register may define the number of broadcast data slots. In some embodiments, broadcast data slots may always come at the beginning of the data field. The data in the broadcast data slots may be used by multiple slave nodes 102-2 and may be passed downstream by all slave nodes 102-2 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 102-2 is coupled to one or more speakers and/or one or more microphones as the peripheral device 108. This is simply illustrative, as any desired arrangement of peripheral device 108 may be coupled to any particular slave node 102-2 in accordance with the techniques described herein.

Figure 8:
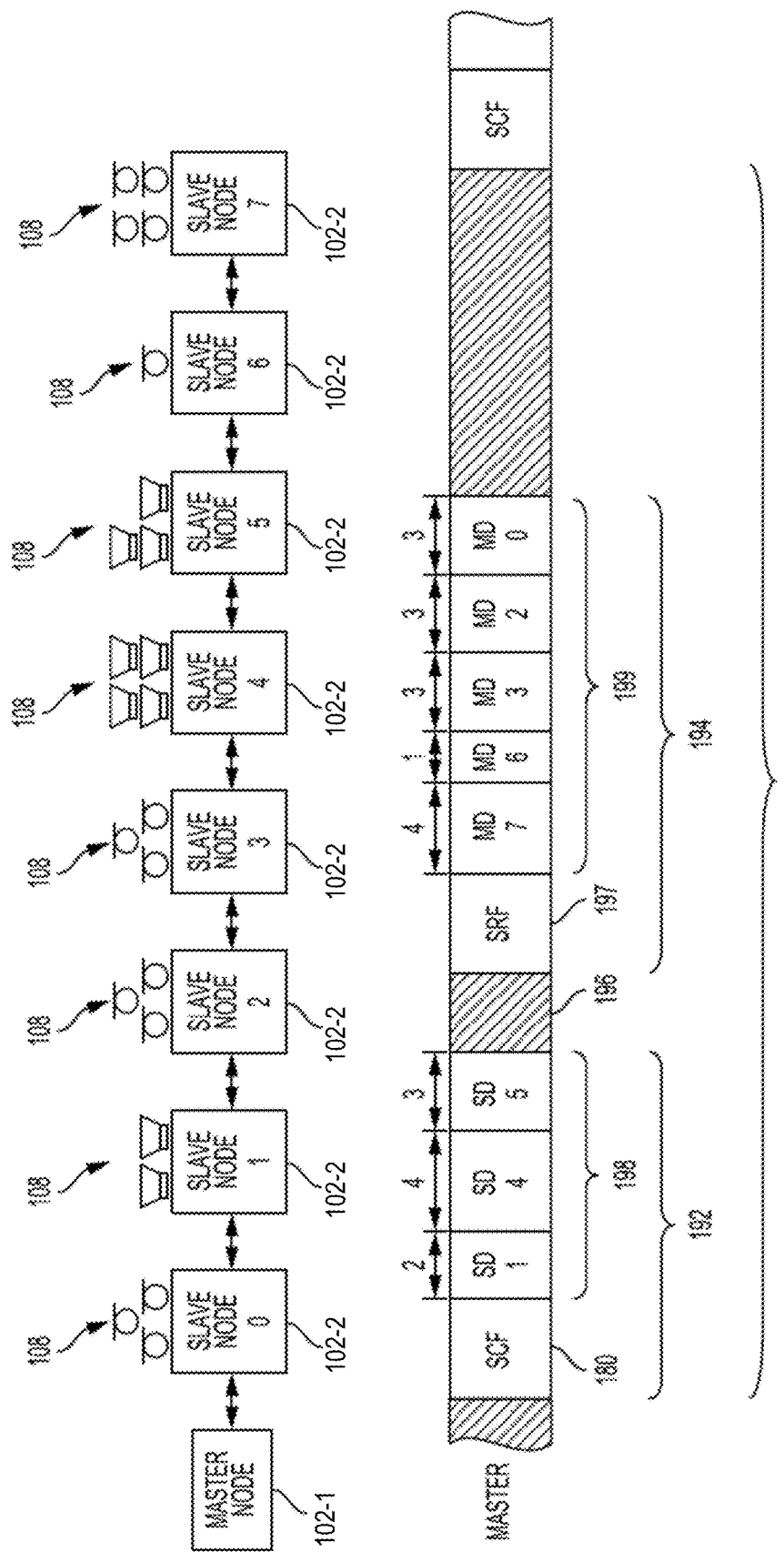
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 102-2 depicted in FIG. 8 have various numbers of sensor/actuator elements, and so different amounts of data may be sent to, or received from, the various slave nodes 102-2. Specifically, slave node 1 has two elements, slave node 4 has four elements, and slave node 5 has three elements, so the data transmitted by the master node 102-1 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 102-2 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the master node 102-1 or from other slave nodes 102-2) to produce a single data sample, which, depending on the type of processing, could correspond to a single time slot or multiple time slots.

In FIG. 8, the master node 102-1 transmits a synchronization control frame (SCF) followed by data for speakers coupled to specific slave nodes 102-2 (SD). Each successive slave node 102-2 forwards the SCF and also forwards at least any data destined for downstream slave nodes 102-2. A particular slave node 102-2 may forward all data or may remove data destined for that slave node 102-2. When the last slave node 102-2 receives the SCF, that slave node 102-2 transmits the synchronization response frame (SRF) optionally followed by any data that the slave node 102-2 is permitted to transmit. Each successive slave node 102-2 forwards the SRF along with any data from downstream slave nodes 102-2 and optionally inserts data from one or more microphones coupled to the particular slave nodes 102-2 (MD). In the example of FIG. 8, the master node 102-1 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
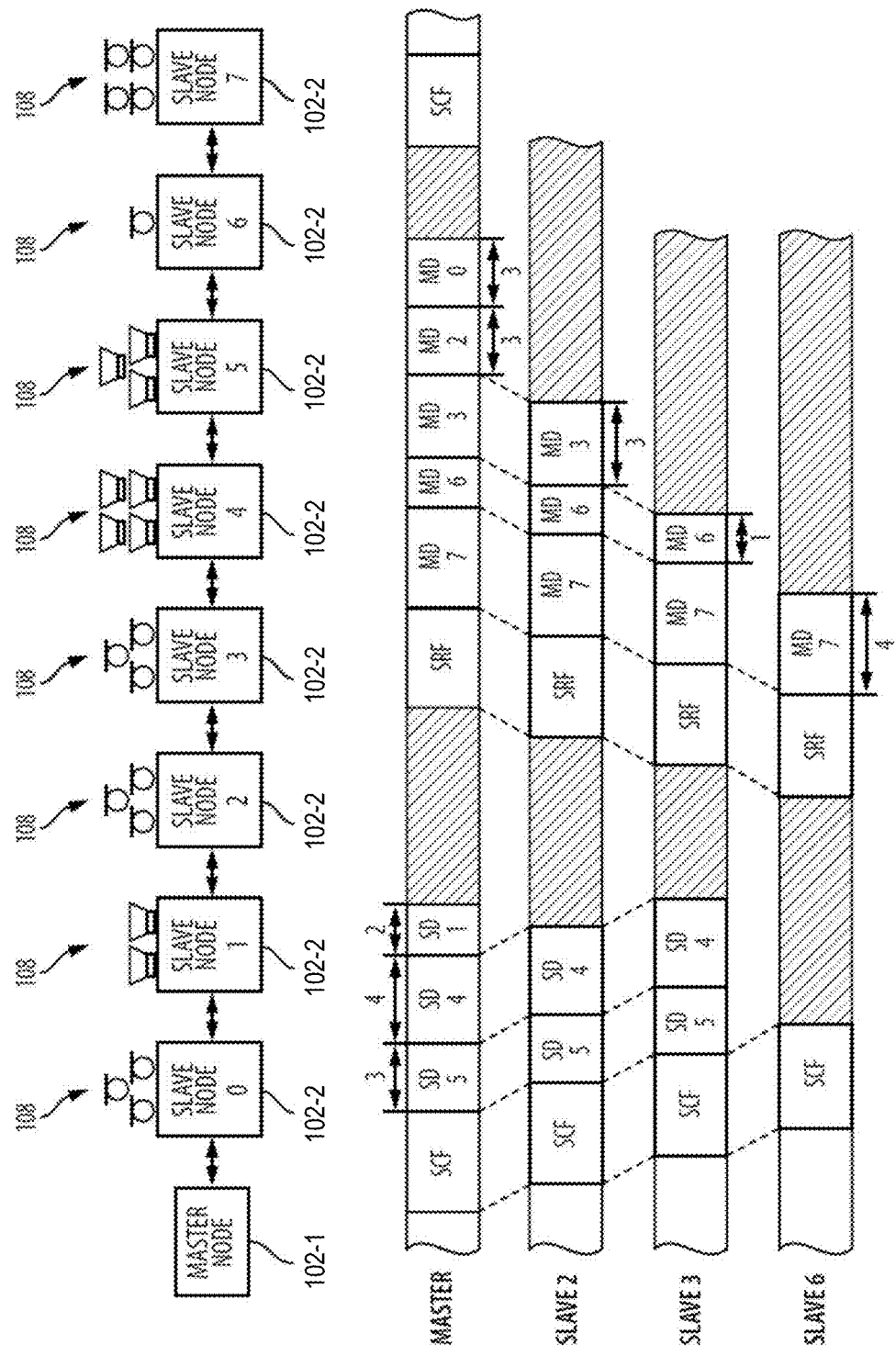

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102-1 transmits a SCF followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the SCF followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the SCF followed by the data for slave node 5, and, similarly, slave node 5 removes its own data and forwards to slave node 6 only the SCF. Slave node 6 forwards the SCF to slave node 7 (see the row labeled SLAVE 6).

At this point, slave node 7 transmits to slave node 6 the SRF followed by its data (see the row labeled SLAVE 6). Slave node 6 forwards to slave node 5 the SRF along with the data from slave node 7 and its own data, and slave node 5 in turn forwards to slave node 4 the SRF along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102-1 receives the SRF followed by the data from slave nodes 7, 6, 3, 2, and 0 (see the row labeled MASTER).

Figure 10:
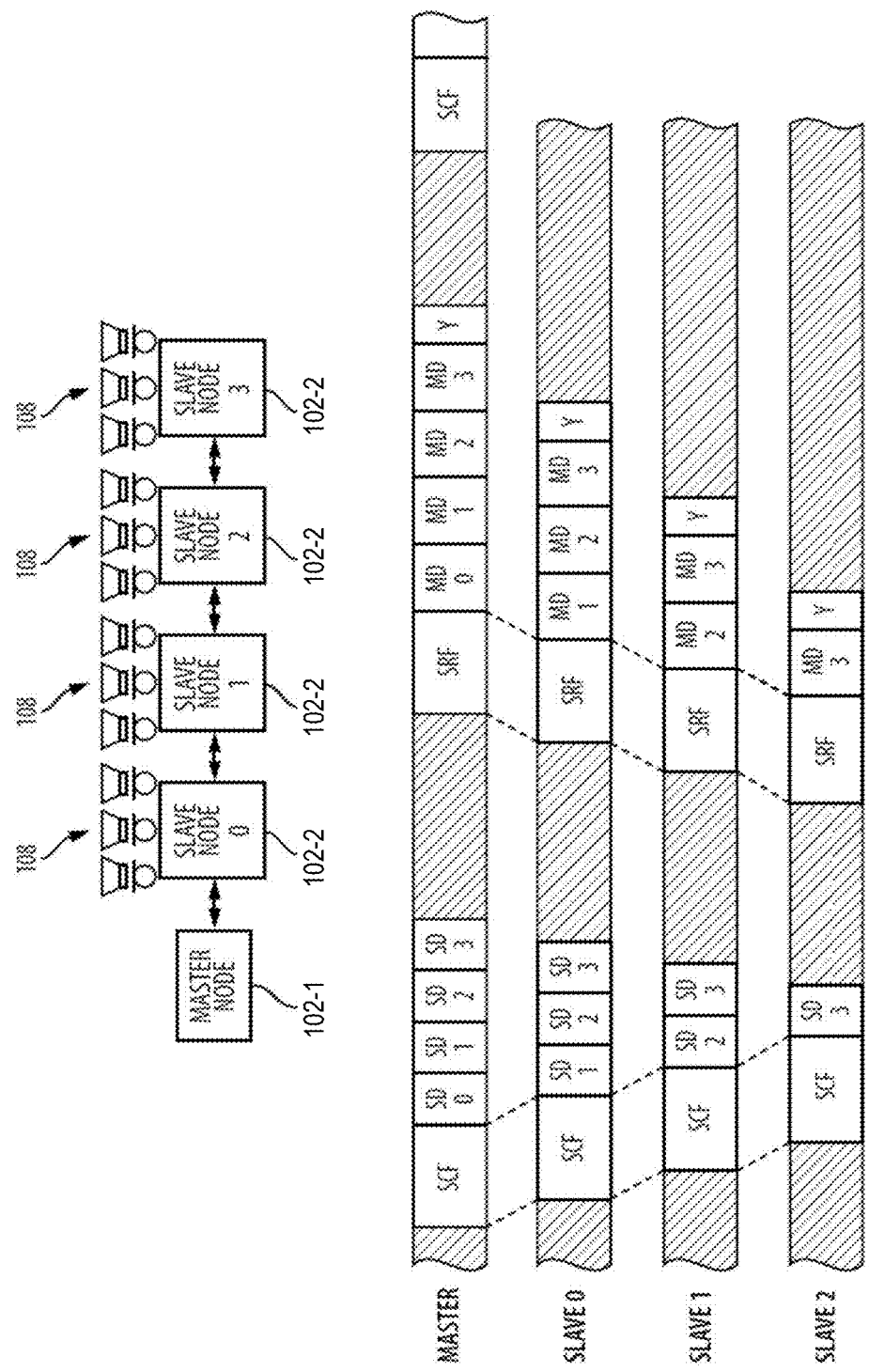

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 102-2 are coupled with both sensors and actuators as the peripheral device 108 such that the master node 102-1 sends data downstream to all of the slave nodes 102-2 and receives data back from all of the slave nodes 102-2. Also, in FIG. 10, the data is ordered based on the node address to which it is destined or from which it originates. The data slot labeled "Y" may be used for a data integrity check or data correction.

Figure 11:
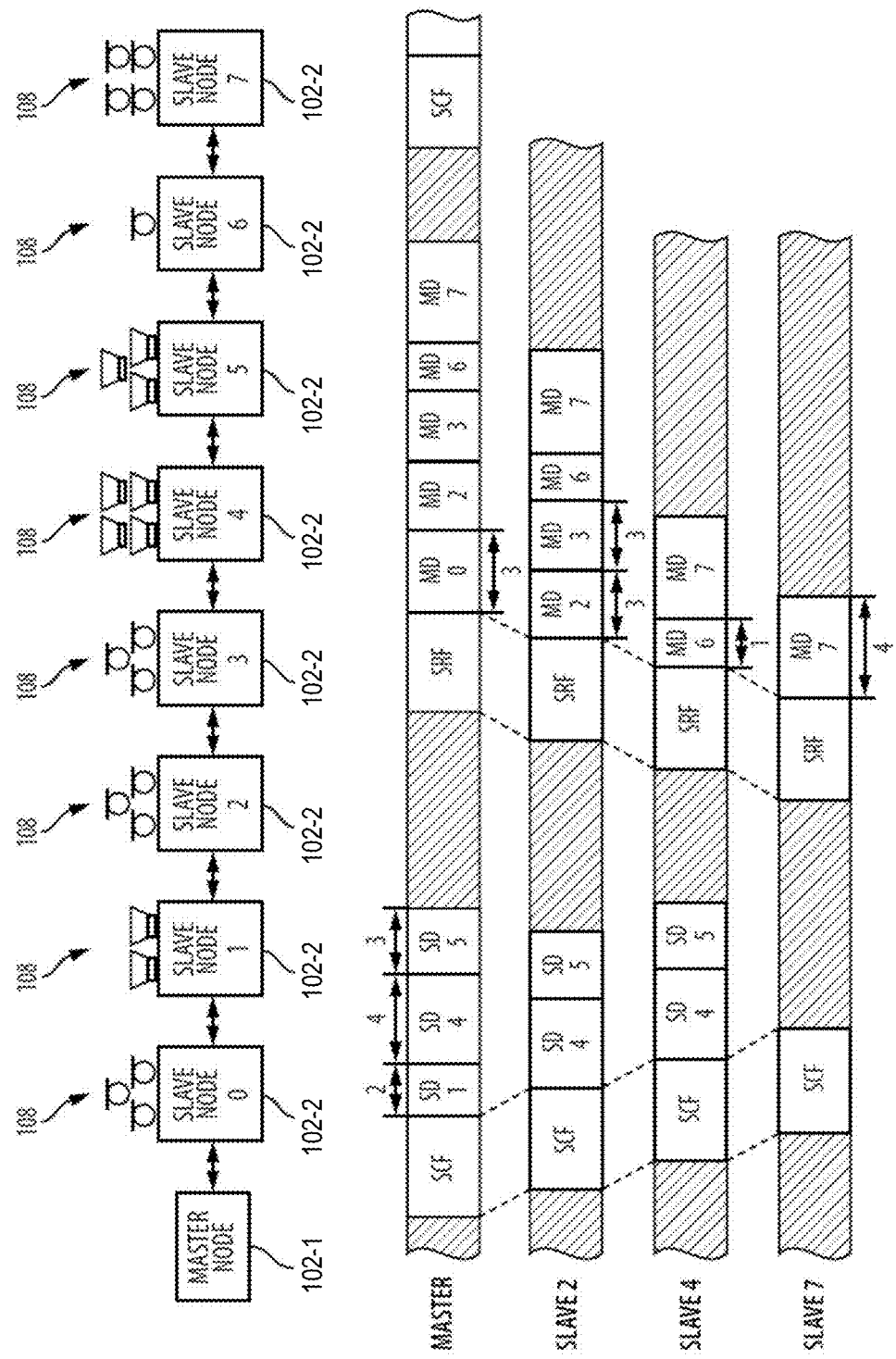

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 102-2 allows for selectively adding, removing, and/or forwarding data.

As discussed above, each slave node 102-2 may remove data from downstream or upstream transmissions and/or may add data to downstream or upstream transmissions. Thus, for example, the master node 102-1 may transmit a separate sample of data to each of a number of slave nodes 102-2, and each such slave node 102-2 may remove its data sample and forward only data intended for downstream slaves. On the other hand, a slave node 102-2 may receive data from a downstream slave node 102-2 and forward the data along with additional data. One advantage of transmitting as little information as needed is to reduce the amount of power consumed collectively by the system 100.

The system 100 may also support broadcast transmissions (and multicast transmissions) from the master node 102-1 to the slave nodes 102-2, specifically through configuration of the downstream slot usage of the slave nodes 102-2. Each slave node 102-2 may process the broadcast transmission and pass it along to the next slave node 102-2, although a particular slave node 102-2 may "consume" the broadcast message, (i.e., not pass the broadcast transmission along to the next slave node 102-2).

The system 100 may also support upstream transmissions (e.g., from a particular slave node 102-2 to one or more other slave nodes 102-2). Such upstream transmissions can include unicast, multicast, and/or broadcast upstream transmissions. With upstream addressing, as discussed above with reference to downstream transmissions, a slave node 102-2 may determine whether or not to remove data from an upstream transmission and/or whether or not to pass an upstream transmission along to the next upstream slave node 102-2 based on configuration of the upstream slot usage of the slave nodes 102-2. Thus, for example, data may be passed by a particular slave node 102-2 to one or more other slave nodes 102-2 in addition to, or in lieu of, passing the data to the master node 102-1. Such slave-slave relationships may be configured, for example, via the master node 102-1.

Thus, in various embodiments, the slave nodes 102-2 may operate as active/intelligent repeater nodes, with the ability to selectively forward, drop, and add information. The slave nodes 102-2 may generally perform such functions without necessarily decoding/examining all of the data, since each slave node 102-2 knows the relevant time slot(s) within which it will receive/transmit data, and hence can remove data from or add data into a time slot. Notwithstanding that the slave nodes 102-2 may not need to decode/examine all data, the slave nodes 102-2 may typically re-clock the data that it transmits/forwards. This may improve the robustness of the system 100.

Figure 12:
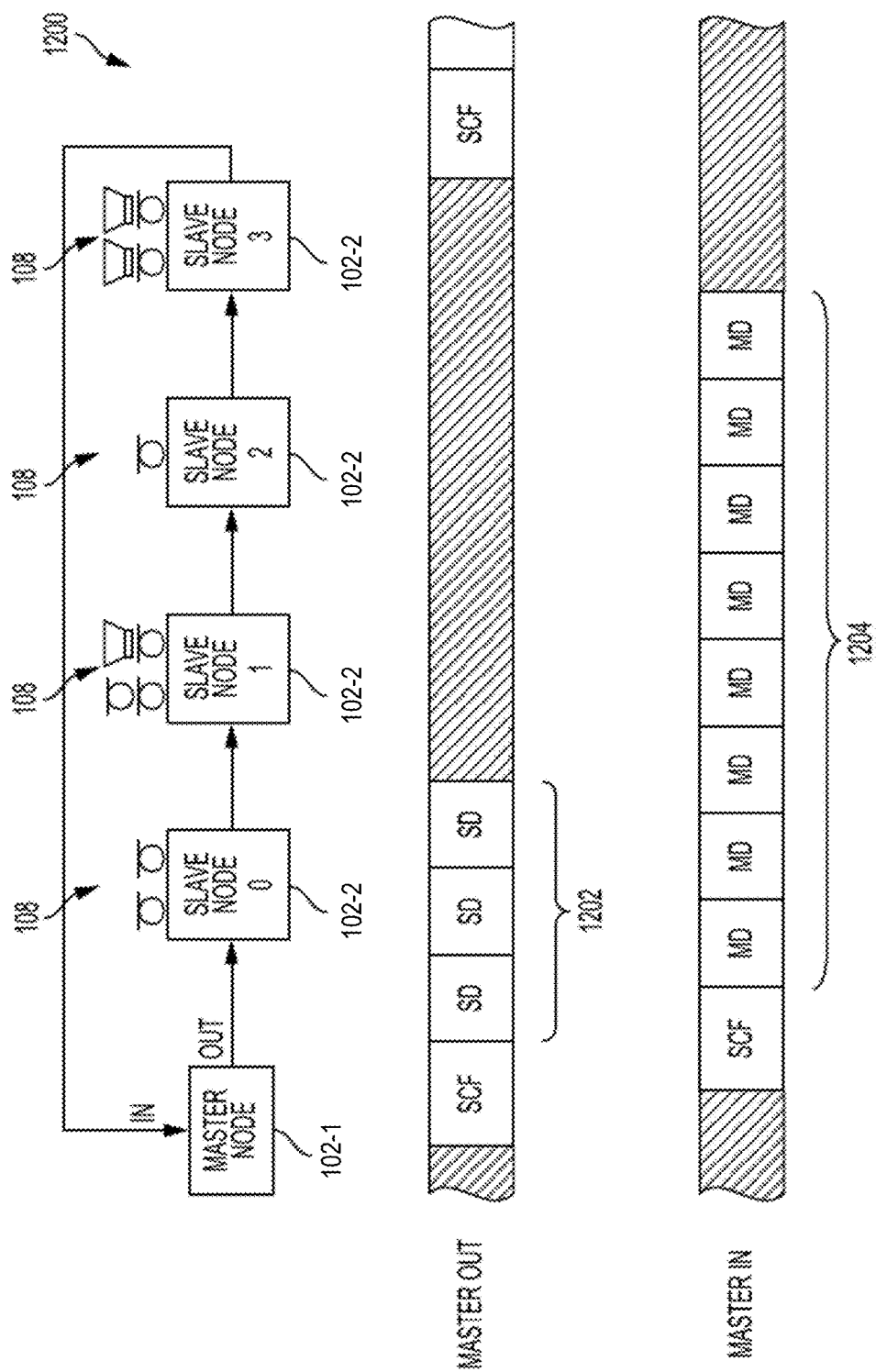
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the master node 102-1 and four slave nodes 102-2 in a ring topology, and illustrates signaling and timing considerations for unidirectional communication in the arrangement 1200, in accordance with various embodiments. In such embodiments, the node transceivers 120 may include a receive-only transceiver (MASTER IN) and a transmit-only transceiver (MASTER OUT), rather than two bi-directional transceivers for upstream and downstream communication. In the link layer synchronization scheme illustrated in FIG. 12, the master node 102-1 transmits a SCF 180, optionally followed by "downstream" data 1202 for the three speakers coupled to various slave nodes 102-2 (the data for the different speakers may be arranged in any suitable order, as discussed above with reference to FIGS. 8-11), and each successive slave node 102-2 forwards the synchronization control frame 180 along with any "upstream" data from prior slave nodes 102-2 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 102-2 or downstream (e.g., using the data slots 198) by a slave node 102-2 or a master node 102-1. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 102-2); accesses to registers of the slave nodes 102-2 (e.g., for discovery and configuration of slots and interfaces) that may include write access from the host 110/master node 102-1 to a slave node 102-2 and read access from a slave node 102-2 to the host 110/master node 102-1; and event signaling via interrupts from a peripheral device 108 to the host 110. In some embodiments, GPIO pins may be used to convey information from a slave node 102-2 to the master node 102-1 (e.g., by having the master node 102-1 poll the GPIO pins over I2C, or by having a node transceiver 120 of a slave node 102-2 generate an interrupt at an interrupt request pin). For example, in some such embodiments, a host 110 may send information to the master node 102-1 via I2C, and then the master node 102-1 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
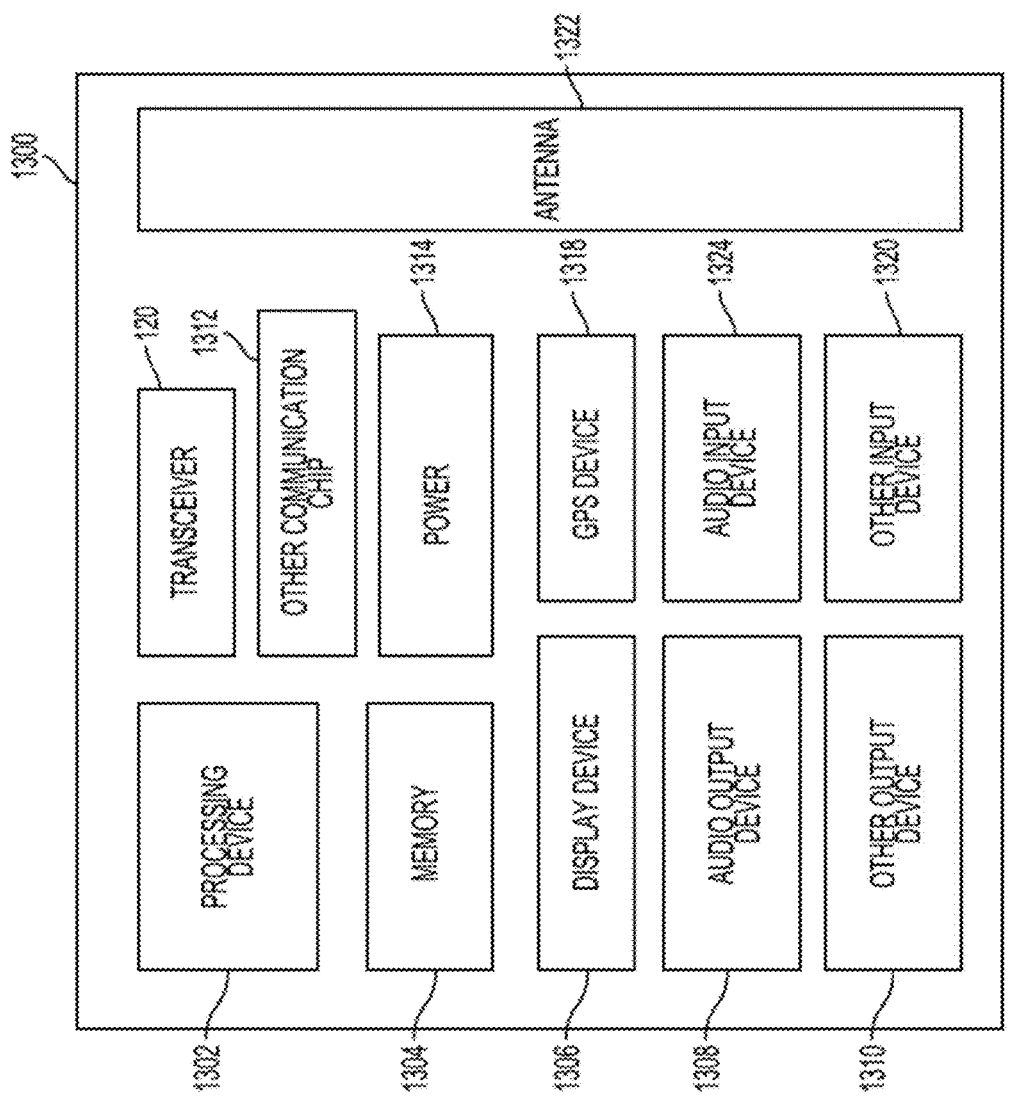
FIG. 13 is a block diagram of a device that may serve as a node or host in the system of FIG. 1, in accordance with various embodiments.
Figure 14:
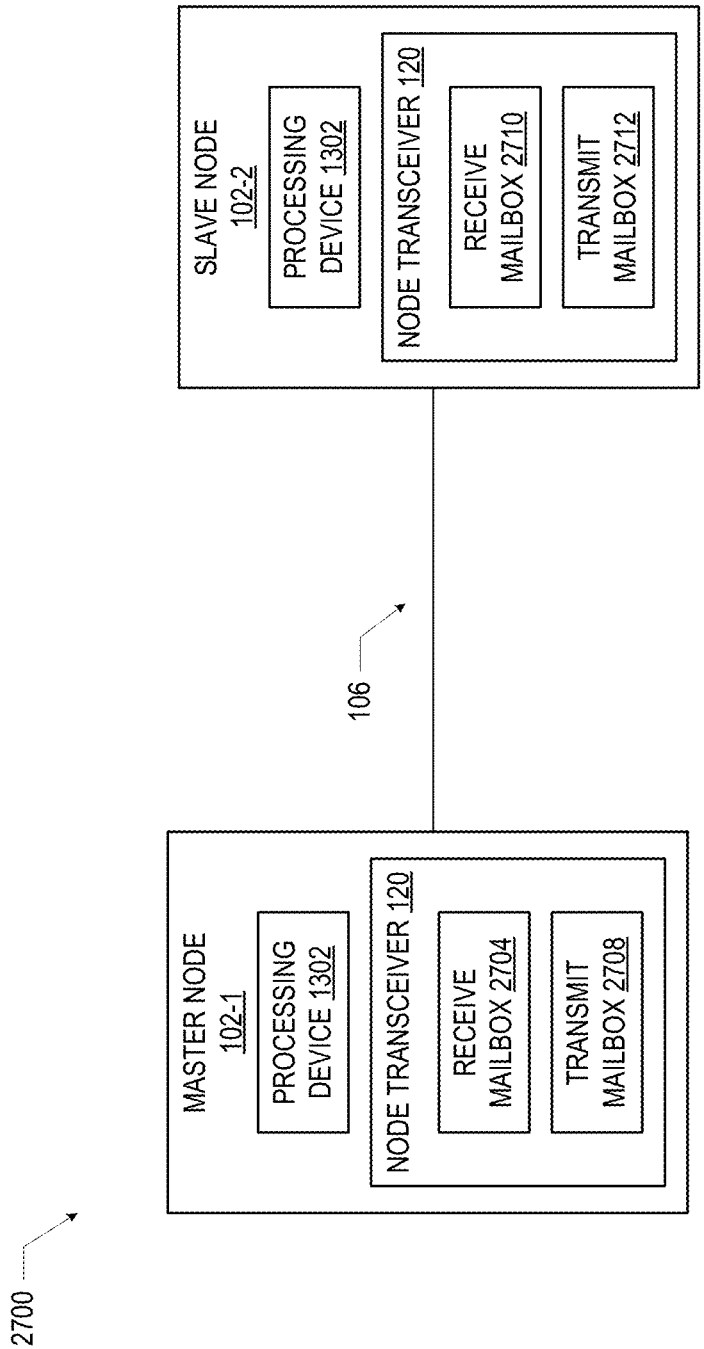
FIG. 14 is a block diagram of an arrangement including transmit and receive mailboxes, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102-1, or a slave node 102-2) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more DSPs, ASICs, central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, Controller Area Network (CAN), I2C, Media Oriented Systems Transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as Global Positioning System (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream filtering circuitry 132 and the downstream filtering circuitry 131 discussed above with reference to FIG. 2 and could be charged by the bias on the bus 106. The battery/power circuitry 1314 may include any of the supporting circuitry 320 or 321 discussed below.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a GPS device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102-1 or a slave node 102-2).

In some embodiments, a master node 102-1 and a slave node 102-2 may each include receive and transmit mailboxes for communication therebetween. Some embodiments may use I2C for the mailbox communication; the I2C interface of a node 102 (e.g., managed by the I2C transceiver 129) may be configured as an I2C slave so that a processing device can program the node 102 over I2C and initiate reads and/or writes to the mailboxes.

In some embodiments, the node transceiver 120 for a slave node 102-2 may include receive and transmit registers that can be used as input and output "mailboxes" for communication between a processing device 1302 of the master node 102-1 and a processing device 1302 of the slave node 102-2 (e.g., a processing device separate from the node transceiver 120), or between a processing device 1302 of another slave node 102-2 and a processing device 1302 of the slave node 102-2. For clarify of illustration, the embodiment in which mailboxes are used to communicate between a master node 102-1 and a slave node 102-2 is discussed below, but the same operations may be performed for mailbox communication between slave nodes 102-2. The master node 102-1 and the slave node 102-2 may be notified of data in their respective mailboxes by an interrupt triggered upon completion of data writing to the mailbox. The node transceiver 120 of a node 102 may be configured to generate an interrupt to a processing device 1302 included in the node 102 upon completion of data writing to a relevant mailbox.

Figure 27:
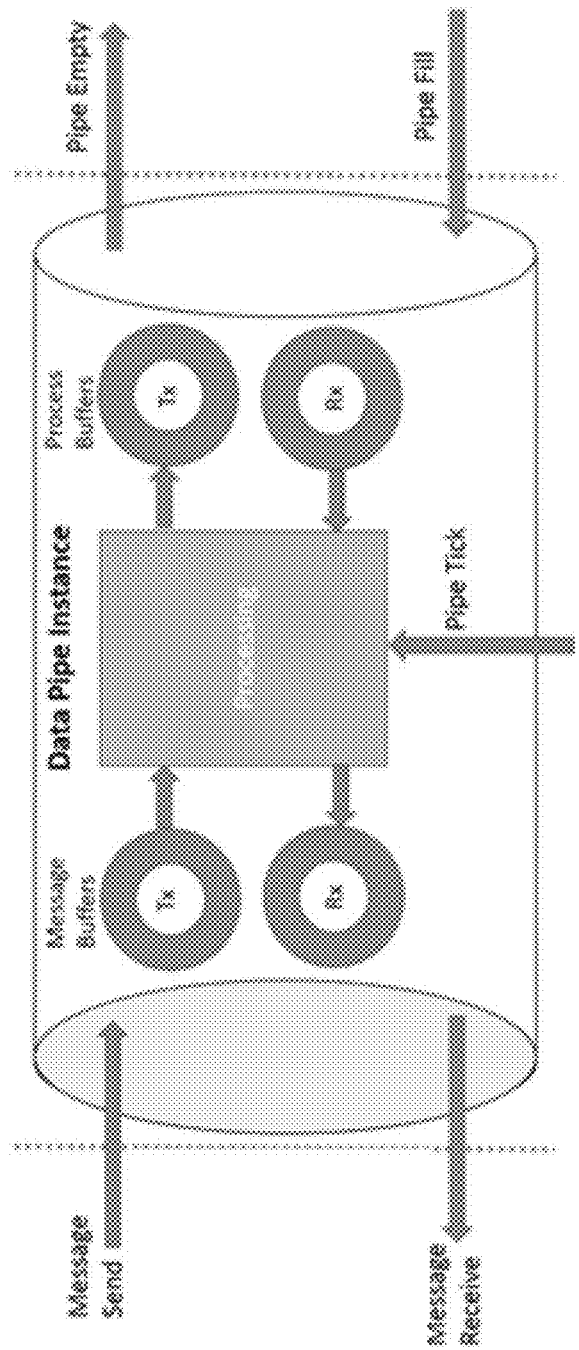
FIGS. 27 and 28 illustrate a data pipe that may be part of a CP-SDN system, in accordance with various embodiments.

FIG. 27 is a block diagram of an arrangement 2700 in which a slave node 102-2 includes a node transceiver 120 having a receive mailbox 2710 and a transmit mailbox 2712 that may be used to communicate with a receive mailbox 2704 and a transmit mailbox 2708 of a master node 102-1. In particular, data provided to the receive mailbox 2710 may be communicated to the processing device 1302 of the slave node 102-2 via an interrupt generated by the node transceiver 120 of the slave node 102-2, and the processing device 1302 of the slave node 102-2 may notify the node transceiver 120 that data is in the transmit mailbox 2712 for transmission to the master node 102-1. The node transceiver 120 of the master node 102-1 may perform analogous operations, and for simplicity of illustration, these operations are discussed below with reference to their performance by a slave node 102-2.

A node transceiver 120 may include a number of registers for control of these mailboxes. In some embodiments, MBOX0CTL and MBOX1CTL registers may provide fields to enable these mailboxes and to control direction, message length, and interrupt enables for the mailboxes.

Mailbox 0 may be configured as a receive mailbox (e.g., the receive mailbox 2710, written by the master node 102-1 and read by a processing device 1302 of the slave node 102-2) by default. Mailbox 1 may be configured as a transmit mailbox (e.g., the transmit mailbox 2712, written by a processing device 1302 of the slave node 102-2 and read by the master node 102-1) by default.

An MBxLEN field of the MBOXxCTL register may define the length of the associated mailbox. If this field is 0, MBOXxB0 may be the final byte of the mailbox. If this field is 1, MBOXxB1 may be the final byte of the mailbox. If this field is 2, MBOXxB2 may be the final byte of the mailbox. If this field is 3, MBOXxB3 may be the final byte of the mailbox.

For an enabled receive mailbox, if an MBxFIEN bit of the MBOXxCTL register is set, an interrupt to the processing device 1302 of the slave node 102-2 may occur after the final byte of the associated mailbox is written by the master node 102-1 and the node transceiver 120 determines that a bus retry was not necessary. If an MBxEIEN field of the MBOXxCTL register is set, an interrupt to the master node 102-1 may occur after the final byte of the associated mailbox is read by the processing device 1302 of the slave node 102-2.

For an enabled transmit mailbox, if the MBxFIEN field is set, an interrupt to the master node 102-1 may occur after the final byte of the associated mailbox is written by the processing device 1302 of the slave node 102-2. If the MBxEIEN failed is set, an interrupt to the processing device 1302 of the slave node 102-2 may occur after the final byte of the associated mailbox is read by the master node 102-1 and the node transceiver 120 determines that a bus retry was not necessary.

In some embodiments, MBOX0STAT and MBOX1STAT registers may provide status information for the mailboxes. When a mailbox is filled, an associated MBxFULL bit of the MBOXxSTAT register may go high and the MBxEMPTY bit may go low. When a mailbox is emptied, an associated MBxEMPTY bit of the MBOXxSTAT register may go high and the MBxFULL bit may go low. MBxEIRQ and MBxFIRQ bits included in the MBOXxSTAT register may go high when the associated mailbox signals an interrupt to the master node 102-1 or local processor (e.g., the processing device 1302 of the slave node 102-2), and may go low when the interrupt is processed by the master node 102-1 or local processor.

In some embodiments, MBOX0Bn and MBOX1Bn registers may contain mailbox data. Each mailbox may hold up to 32 bits of data in some examples. An MBxLEN field in the MBOXxBn register may define the number of active bytes in the mailbox. In some embodiments, each mailbox may support 8-, 16-, 24-, or 32-bit messages.

As noted above, disclosed herein are systems and techniques for sending content protected digital data (e.g., digital audio) over synchronous, continuous, data networks (e.g., two-wire, daisy-chained master/slave communication networks like the systems 100 disclosed herein). As used herein, a "content protection" technique or system is designed to prevent or limit unauthorized access to and/or reproduction of media content (e.g., software, films, music, books, etc.). Synchronous communication networks may be contrasted with asynchronous communication networks, such as conventional packet-based communication networks. Some embodiments of this technology involve sending synchronous data (e.g., audio and/or video) over a synchronous communication network (e.g., any of the systems 100 disclosed herein) along with required link synchronization information for seamless data encryption and decryption between transmitter and receiver. Techniques for link synchronization over asynchronous data networks exist, but establishing such link synchronization over SDNs presents new challenges. The SDNs disclosed herein may support high-definition audio, for example, allowing Blu-ray, Video on Demand (VOD) services, and other high-definition (HD) audio and video to be transmitted securely over the SDN.

The systems and techniques disclosed herein may support any suitable digital transmission specifications, such as any suitable content protection specifications available from Digital Content Protection LLC (DCP) or the Digital Transmission Licensing Authority (DTLA) (e.g., High-Bandwidth Digital Content Protection (HDCP), Digital Transmission Content Protection (DTCP), etc.). These specifications may provide standards for preventing or limiting the copying of digital video and audio content as it travels across networks or other connected sets of devices (e.g., using a High-Definition Multimedia Interface (HDMI) protocol, a Digital Visual Interface (DVI) protocol, a MOST protocol, a Mobile High-Definition Link (MHL) protocol, a Digital Video (DV) protocol, or a Gigabit Video Interface (GVIF) protocol). To enable infotainment systems (e.g., in vehicles) to support more HD media content and/or content sourced from protected devices like mobile phones, Blu-ray players, and/or online on-demand sources, the systems and techniques disclosed herein may provide protected interfaces that connect different media nodes (e.g., a master node 102-1 and one or more slave nodes 102-2) in a vehicle or other setting (for audio and/or video). For example, a system 100 implementing any of the content protection techniques disclosed herein may prevent or limit the unauthorized reproduction of video content in storage and while transferring the video content from one device to another (for example, from a media player to a television or other display, or from a head unit of a vehicle to a main amplifier of the vehicle).

Figure 15:
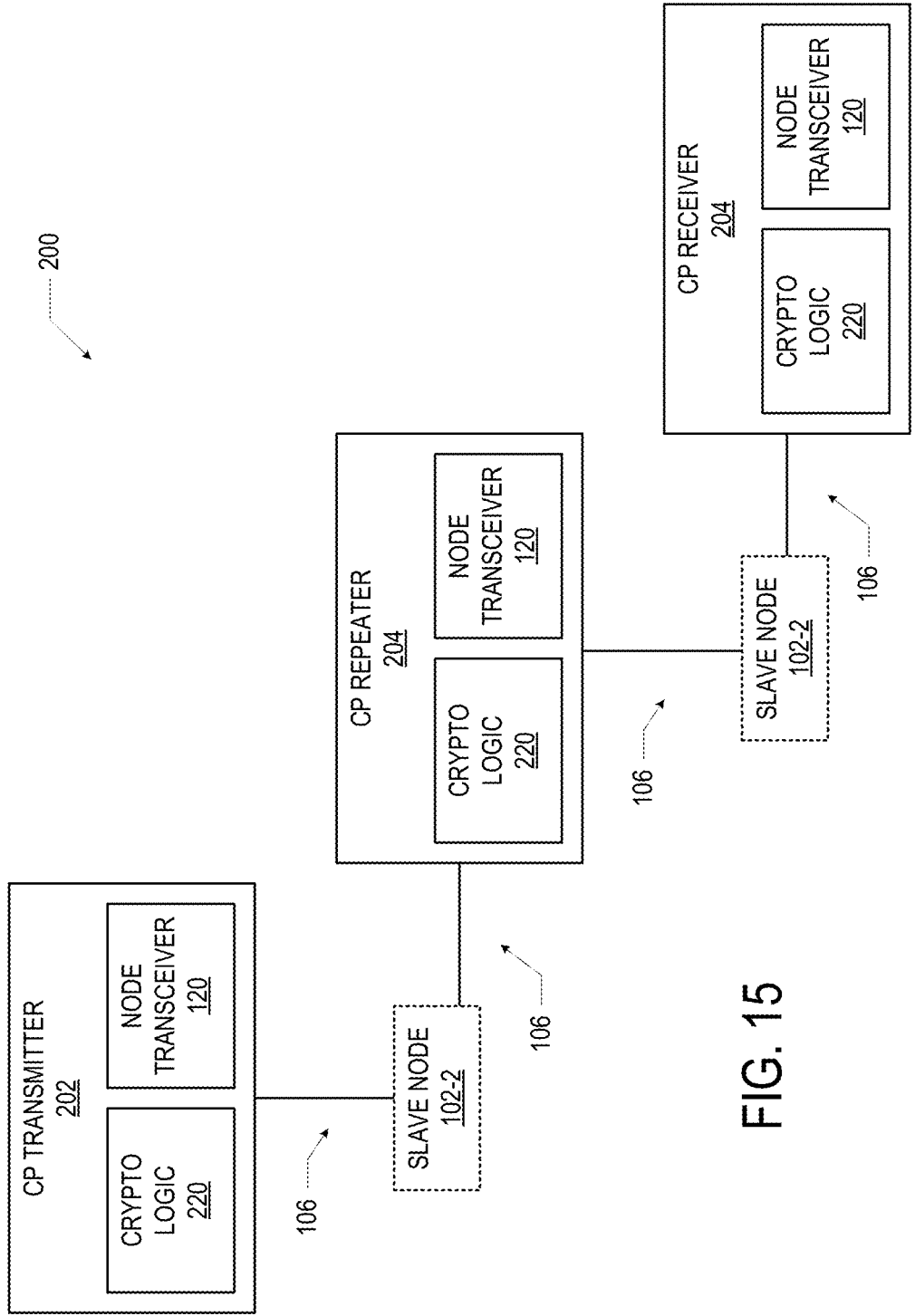
FIG. 15 is a block diagram of a content protection synchronous data network (CP-SDN) system, in accordance with various embodiments.

FIG. 15 illustrates a content protection synchronous data network (CP-SDN) system 200, including a CP-SDN transmitter 202, a CP-SDN repeater 204, and a CP-SDN receiver 206. The CP-SDN transmitter 202, CP-SDN repeater 204, and CP-SDN receiver 206 are communicably connected via the bus 106, and may each include a node transceiver 120 (such that the CP-SDN transmitter 202, CP-SDN repeater 204, and CP-SDN receiver 206 include nodes 102 of a system 100). One or more additional slave nodes 102-2, including their own node transceivers 120, may be distributed through the system 200, as shown. Note that a CP-SDN system 200 need only include two components (e.g., one CP-SDN transmitter 202 and one CP-SDN receiver 206) that communicate CP content via node transceivers 102 and a bus link 106 therebetween, but may include more components (e.g., the components of FIG. 15) arranged in any suitable manner. A CP-SDN transmitter 202 may have the ability to encrypt and transmit CP content (e.g., content protected in accordance with the HDCP standard) along upstream and/or downstream links of the bus 106. A CP-SDN receiver 206 may have the ability to receive and decrypt CP content received from upstream and/or downstream links of the bus 106. A CP-SDN repeater 204 may have the ability to encrypt and decrypt CP content, and can also receive CP content from upstream and/or downstream bus links 106, as well as transmit CP content along upstream and/or downstream bus links 106. Note that the operations of a CP-SDN repeater 204 includes the operations of a CP-SDN receiver 206 and the operations of a CP-SDN transmitter 202, and thus for ease of illustration, some of the discussion herein will focus on interactions between a single CP-SDN transmitter 202 and a single CP-SDN receiver 206, but these interactions may be performed between any pair of CP components at either end of a bus link 106, and a system 200 may include any suitable number and arrangement of components. In particular, a CP-SDN repeater 204 may include the hardware and perform the operations described herein with reference to a CP-SDN transmitter 202, and may also include the hardware and perform the operations described herein with reference to a CP-SDN receiver 206.

The CP-SDN transmitter 202, CP-SDN repeater 204, and CP-SDN receiver 206 include cryptographic logic 220 (e.g., including stored programming instructions for execution by a processing device), as known in the art, to perform required encryption and/or decryption of the CP content. The node transceivers 120 in the CP-SDN transmitter 202, CP-SDN repeater 204, and CP-SDN receiver 206 may communicate with the cryptographic logic 220 to provide CP content to the cryptographic logic 220 (transmitted to the node transceiver 120 over the bus 106) and/or receive CP content from the cryptographic logic 220 (for transmission over the bus 106). The other slave nodes 102-2 in the system 200 may act simply as relays, receiving CP content and passing it along the bus 106 to the next slave node 102-2.

A system 200 may also include transmitters ("sources"), repeaters, and/or receivers ("sinks") of CP data that receive and/or transmit this data via interfaces other than the bus 106 (e.g., via HDMI cables or wirelessly); such devices are not shown in FIG. 15, but examples of these devices are discussed below with reference to FIGS. 19-22. Additionally, non-CP content (e.g., unencrypted audio) may also be transmitted through the system 200 in accordance with any of the techniques discussed herein with reference to the system 100; an example of a system 200 in which CP and non-CP content is transmitted is discussed below with reference to FIG. 19. In a CP-SDN system 200, the CP-SDN transmitter 202 may include a node 102 of a system 100, and the CP-SDN receiver 206 may include another node 102 of the system 100. In some particular embodiments, the CP-SDN transmitter 202 may include a master node 102-1 of a system 100, and the CP-SDN receiver 206 may include a slave node 102-21n some vehicle embodiments, for example, the CP-SDN transmitter 202 may be part of the vehicle's head unit, and may include the master node 102-1 of a system 200. More generally, a system 200 includes sub-system 100 that provides a protected pathway for data on any one or more links between a CP source and a CP sink.

As noted above, in some embodiments, a system 200 supporting HDCP may be used to provide a direct point-to-point connection between the output of a protected data source (received at a CP-SDN transmitter 202) and a data sink (coupled to the CP-SDN receiver 206). Such SDNs may be used to enable HDMI interfaces between nodes 102 of a system 100, which may require HDCP protection. When the system 100 supports HDCP in accordance with the embodiments disclosed herein, integration of HDMI devices as peripheral devices 108 in the system 100 may be readily achieved. Such systems 100 may be utilized in an infotainment system in a vehicle, for example. Devices that support HDCP (e.g., a master node 102-1 or a slave node 102-2) may be limited by the HDCP license to not allow for copying of the HDCP content, to not permit sending digital content over non-HDCP links, and to not allow HDCP keys to be accessible from outside the device.

In a system 200 that supports HDCP, the DCP specification may serve to define HDCP operation for many commonly used media links, including HDMI, DVI, MHL, WirelessHD, DisplayPort, Universal Serial Bus (USB), and others. DCP may also define an Interface Independent Adaptation (IIA) for any interface choosing to adopt and license DCP under the appropriate agreement. In particular, a system 200 may implement the IIA standard over the software stack supporting communication along the bus 106.

A CP-SDN transmitter 202 and a CP-SDN receiver 206 may utilize multiple cryptographic algorithms, including Advanced Encryption Standard 128 (AES-128), Rivest-Shamir-Adleman (RSA), Elliptic Curve Cryptography (ECC), M6, Hash-based Message Authentication Codes (HMAC), a Pseudo-Random Number Generator (PRNG), and hash functions. These algorithms may be verified against the test vectors is supplied in the HDCP specification. In particular, a processing device 1302 of a CP-SDN transmitter 202 or a CP-SDN receiver 206 may implement all of the required cryptographic algorithms in software, and in some embodiments, may have access to hardware cryptographic engines.

Figure 16:
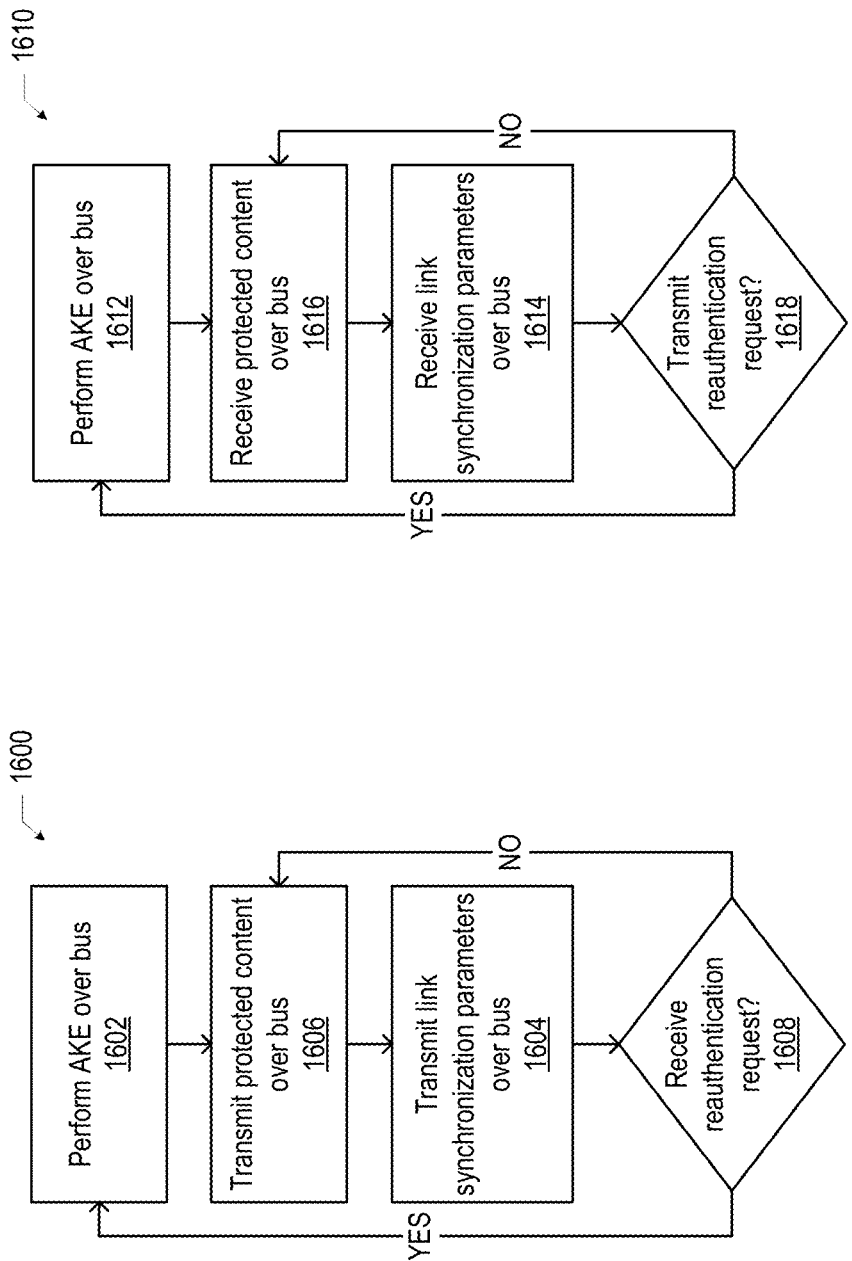
FIG. 16A is a flow diagram of operations that may be performed by a CP-SDN transmitter, in accordance with various embodiments.
FIG. 16B is a flow diagram of operations that may be performed by a CP-SDN receiver, in accordance with various embodiments.

In a system 100 supporting HDCP, the CP-SDN transmitter 202 may verify the authenticity of the CP-SDN receiver 206, and then may send encrypted content meant to be decrypted only by the authenticated CP-SDN receiver 206. FIGS. 16A and 16B are flow diagrams of complementary methods 1600 and 1610, respectively, for the interaction between a CP-SDN transmitter 202 (the method 1600 of FIG. 16A) and a CP-SDN receiver 206 (the method 1610 of FIG. 16B). The system 200 may perform an authentication and key exchange (AKE) (1602 and 1612 of FIGS. 16A and 16B, respectively) before the CP-SDN transmitter 202 begins transmitted protected content to the CP-SDN receiver 206. The AKE may utilize a known method to exchange a key for symmetric encryption/decryption using an asymmetric encryption/decryption mechanism. In particular, an RSA algorithm may be used to exchange the keys. In some embodiments, the mailbox functionality described above may be used to transmit messages between the CP-SDN transmitter 202 and the CP-SDN receiver 206 during AKE. In some embodiments, a data link layer may be implemented for local delivery of HDCP messages. Such a data link layer may follow the International Organization for Standardization (ISO) High-Level Data Link Control (HDLC) protocol to allow the passing of a synchronous HDCP messages over the synchronous bus 106.

Upon successful completion of the AKE, HDCP encryption may be enabled in the CP-SDN transmitter 202, and the CP-SDN transmitter 202 may begin to transmit protected content to the CP-SDN receiver 206 (1604 and 1614 of FIGS. 16A and 16B, respectively). When the system 200 is transmitting HDCP data, the data may be encrypted using the AES-128 encryption standard. In some such embodiments, each AES call may correspond to 16 bytes of encrypted data. When 24-bit audio samples are to be transmitted, 16 consecutive samples in each channel (a total of 48 bytes) may be used for encryption/decryption (corresponding to 3 AES-128 encryption/decryption calls per slot). For HD audio, a 2× or 4× sampling frequency may be accommodated by using two or four audio slots, respectively, and related information may be passed in the stream header to allow the CP-SDN receiver 206 to properly identify the multiple slots as audio output samples.

Figure 17:
FIG. 17 illustrates a set of frames that may be used to transmit CP audio data over time, in accordance with various embodiments.

To maintain link synchronization between the CP-SDN transmitter 202 and the CP-SDN receiver 206, the CP-SDN transmitter 202 may periodically include link synchronization parameters in a synchronous slot as a stream header (1606 and 1616 of FIGS. 16A and 16B, respectively). These link synchronization parameters may include a frame sequence number, which may be used by the CP-SDN receiver 206 to latch onto a set of frames (e.g., a set of 16 frames) that are encrypted together. The use of a set of 16 frames may, in some embodiments, ensure that the number of bytes used to encrypt/decrypt is always a multiple of 128 bits, which may be particularly suitable for AES-128 encryption. FIG. 17 illustrates a set of frames that may be used to transmit HDCP audio data over time. The link synchronization parameters may also include a stream counter (which may be defined by the most upstream CP-SDN transmitter 202), and an input counter (which may be incremented by one for each encryption/decryption). FIG. 18 illustrates a set of frames that includes such stream headers. The CP-SDN receiver 206 may receive these parameters and may use them to maintain link synchronization between the CP-SDN transmitter 202 and the CP-SDN receiver 206 in accordance with HDCP, and to verify the integrity of the exchange. In the event of a mismatch, the CP-SDN receiver 206 may request reauthentication from the CP-SDN transmitter 202 (1608 and 1618 of FIGS. 16A and 16B, respectively). In some embodiments, if there is a mismatch in the input counter value at the end of each processed block, the receiver may flag a link synchronization error and "mute" the output at the receiver. Link synchronization is discussed further below with reference to FIGS. 24-25.

When HDCP data is to be transmitted over the bus 106, the cipher used for data encryption may take the form defined by the HDCP specification. When the data is synchronous data (e.g., audio), the byte order in which encryption takes place may begin with the cipher considering the most significant byte of the first sample in the first channel until the least significant byte is reached. The cipher may then advance from the first sample through to the sixteenth sample of the data block (e.g., frame sequence number 0x0 to 0xF). The cipher may then advance in a similar fashion until the last channel of the stream is reached. For example, if a stream of 5. 1 channel, 24-bit audio is to be transmitted, the encryption may start with the most significant byte of the first sample in the first channel, continue in a similar fashion until the sixteenth sample, then move forward with the second channel and so on until the sixth channel is reached. Such an approach may ensure that synchronous CP data, such as audio, continues to be transmitted synchronously across the bus 106. The additional control slot may synchronize the transmitter and receiver, as discussed herein. Authentication protocol messages may take the form defined in the HDCP specification, although in some embodiments, the messages RepeaterAuth_Stream_Manage and RepeaterAuth_Stream_Ready may not be implemented as content stream management may not be applicable.

For robust communication, bit errors in the encrypted data communicated in a system 100 should be detected and corrected. If such bit errors are ignored, decryption may result in noise samples in the output (e.g., 16 noise samples in an audio output corresponding to a set of 16 frames). Communication errors may be indicated in an I2S/TDM error data channel (via the I2S/TDM/PDM transceiver 127 of the node transceiver 120) following the content data channels. Simply repeating the last good known sample in the event of a bit error may not be adequate for HDCP, as the integrity of the data in the set of frames (e.g., 16 samples) is lost and cannot be decrypted. Error handling schemes that include re-requesting a packet (implemented as a data link layer) may not be feasible or desirable for synchronous applications (e.g., audio transfer) and may lead to severe delay. Instead, upon detection of a bit error in the encrypted audio data, the CP-SDN receiver 206 may identify the air and may repeat the last set of decrypted samples as a decryption output so as to permit continuous playback of content (e.g., video or audio). In some embodiments, detection of a bit error may trigger a request for reauthentication, as discussed above with reference to FIG. 16. In response to this request, a master node 102-1 may then initiate diagnostics.

Figure 19:
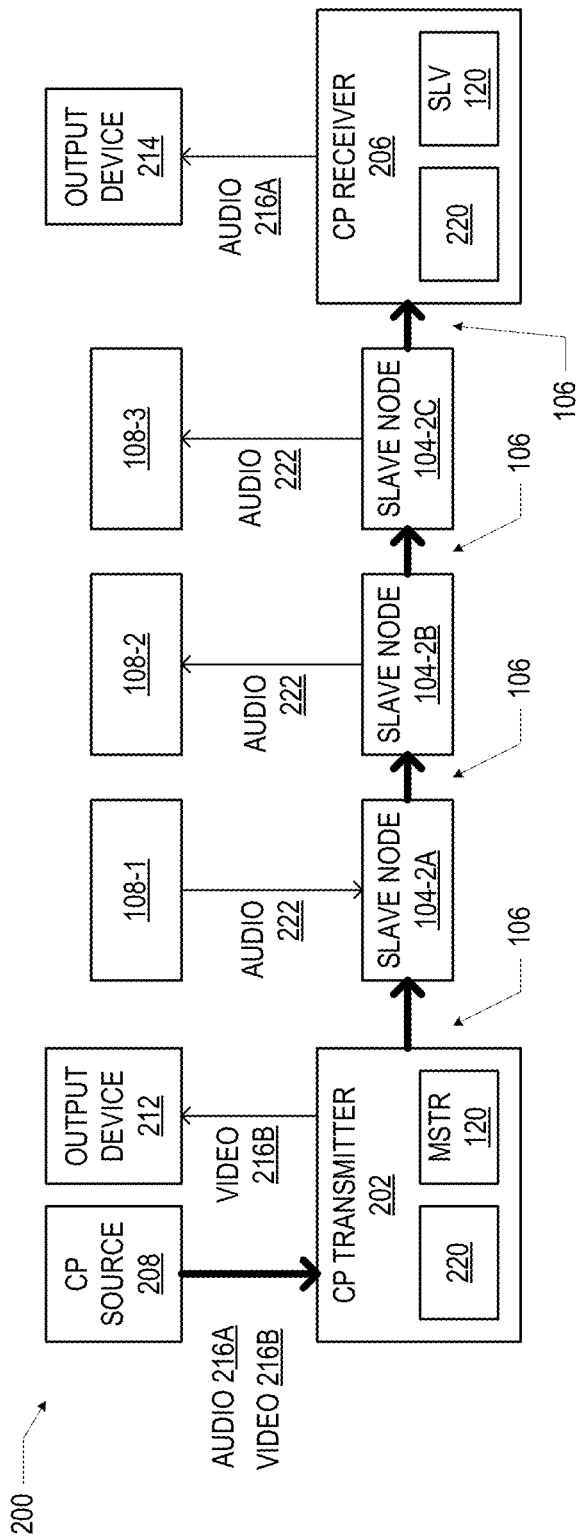
FIGS. 19-22 illustrate some examples of CP-SDN systems, in accordance with various embodiments.

FIG. 19 illustrates another example system 200 in which CP content is transmitted over the bus 106. In the system 200 of FIG. 19, a CP source 208 (e.g., a Blu-ray player) generates CP audio 216A (e.g., HDMI audio) and CP video 216B (e.g., HDMI video). The CP audio 216A and the CP video 2166 is transmitted to a CP-SDN transmitter 202 (e.g., via an HDMI cable), where cryptographic logic 220 of the CP-SDN transmitter 202 may decrypt the CP video 216B and provide the decrypted CP video 216B to an output device 212 (e.g., a television), which may output the decrypted CP video 216B. The cryptographic logic 220 of the CP-SDN transmitter 202 may decrypt the CP audio 216A, and then reencrypt the decrypted CP audio 216A and transmit the reencrypted CP audio 216A (referred to below as simply "the CP audio 216A") to the node transceiver 120 of the CP-SDN transmitter 202. Note that the CP-SDN transmitter 202 may both decrypt and reencrypt CP data, and thus may be serve as a CP repeater; since it only transmits CP content over a bus link 106 (and does not, in the illustrated example, receive CP content over a bus link 106), the device is referred to as a CP-SDN transmitter 202. The node transceiver 120 of the CP-SDN transmitter 202, which may be configured to act as a master node 102-1, may then transmit the CP audio 216A to a slave node 102-2A via a link of the bus 106. The slave node 102-2A may be coupled to a peripheral device 108-1 that includes a non-CP audio source (e.g., a radio tuner), and the slave node 102-2A may receive non-CP audio 222 from the peripheral device 108-1 (in accordance with any of the techniques disclosed herein). The slave node 102-2A may then transmit both the CP audio 216A and the non-CP audio 222 to a slave node 102-2B via another link of the bus 106. In some embodiments, the slave node 102-2B may be a bus monitor, which may be able to monitor the signals flowing along the bus 106. The slave node 102-2B may also be coupled to a peripheral device 108-2 that includes an audio output device (e.g., a pair of mono speakers). The slave node 104-2B may provide the non-CP audio 222 to the peripheral device 108-2 for output, and may also transmit both the CP audio 216A any non-CP audio 222 to another slave node 102-2C via another link of the bus 106. The slave node 102-2C may also be coupled to a peripheral device 108-3 that includes an audio output device (e.g., a stereo speaker), and the slave node 102-2C may provide the non-CP audio 222 to the peripheral device 108-3 for output. The slave node 102-2C may then remove the non-CP audio 222 from further transmission along the bus 106 (in accordance with techniques disclosed herein), and only transmit the CP audio 216A to a CP-SDN receiver 206 via another link of the bus 106. The node transceiver 120 of the CP-SDN receiver 206 may provide the CP audio 216A to the cryptographic logic 220 of the CP-SDN receiver 206, and the cryptographic logic 220 of the CP-SDN receiver 206 may decrypt the CP audio 216A and provide the decrypted CP audio 216A to an output device 214 (e.g., a stereo speaker) for output.

Figure 20:
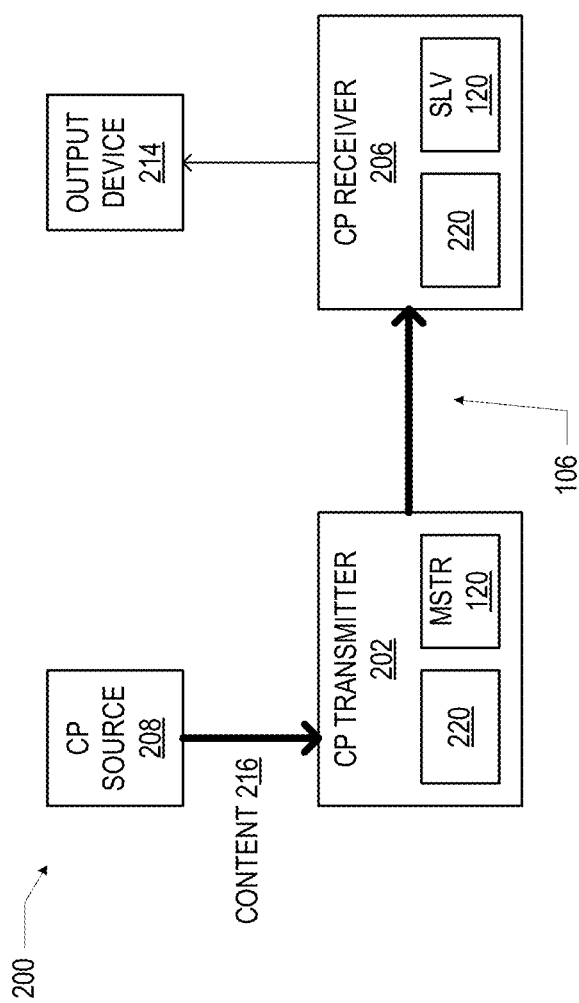

FIG. 20 illustrates another example system 200 in which CP content is transmitted over the bus 106. In the system 200 of FIG. 20, a CP source 208 (e.g., a Blu-ray player, a smart phone, or a streaming service) generates CP content 216 (e.g., HDMI audio) and transmits the CP content 216 to a CP-SDN transmitter 202 (e.g., via an HDMI cable or a wireless communication connection). Cryptographic logic 220 of the CP-SDN transmitter 202 may decrypt the CP content 216 and then reencrypt the decrypted CP content 216 and transmit the reencrypted CP content 216 (referred to below as simply "the CP content 216") to the node transceiver 120 of the CP-SDN transmitter 202. The node transceiver 120 of the CP-SDN transmitter 202, which may be configured to act as a master node 102-1, may then transmit the CP content 216 to a CP-SDN receiver 206 via a link of the bus 106. The node transceiver 120 of the CP-SDN receiver 206, which may act as a slave node 102-2, may provide the CP content 216 to the cryptographic logic 220 of the CP-SDN receiver 206, and the cryptographic logic 220 of the CP-SDN receiver 206 may decrypt the CP content 216 and provide the decrypted CP content to an output device 214 (e.g., an amplifier and/or a speaker). In some embodiments, the CP-SDN transmitter 202 may be part of the head unit of a vehicle, and the output device 214 may be an amplifier in the trunk of the vehicle.

Figure 21:
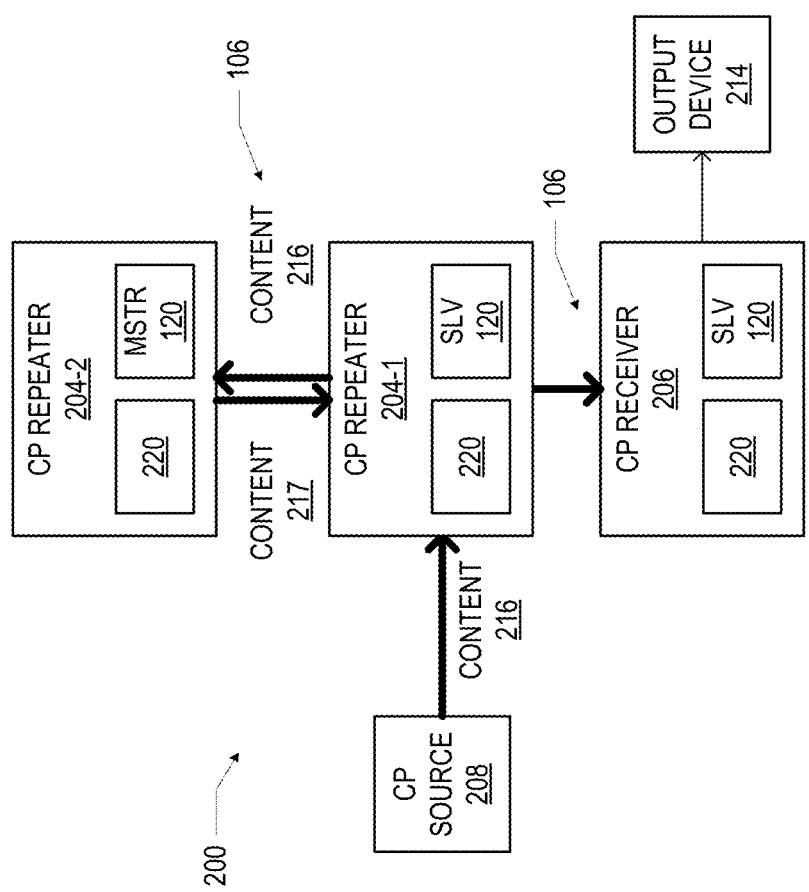

FIG. 21 illustrates another example system 200 in which CP content is transmitted over the bus 106. In the system 200 of FIG. 21, a CP source 208 (e.g., a Blu-ray player, a smart phone, or a streaming service) generates CP content 216 (e.g., HDMI audio) and transmits the CP content 216 to a CP-SDN repeater 204-1 (e.g., via an HDMI cable or wireless communication connection). Cryptographic logic 220 of the CP-SDN repeater 204-1 may decrypt CP content 216 and then reencrypt the decrypted CP content 216 and transmit the reencrypted CP content 216 (referred to below as simply "the CP content 216") to the node transceiver 120 of the CP-SDN repeater 204-1. The node transceiver 120 of the CP-SDN repeater 204-1, which may be configured to act as a slave node 102-2, may then transmit the CP content 216 to another CP-SDN repeater 204-2 via an upstream link of the bus 106. The node transceiver 120 of the CP-SDN repeater 204-1 may also transmit the CP content 216 to a CP-SDN receiver 206 via a downstream link of the bus 106. Cryptographic logic 220 of the CP-SDN repeater 204-2 may decrypt the CP content 216 and utilize the decrypted CP content 216 as desired. The node transceiver 120 of the CP-SDN repeater 204-2, which may be configured to act as a master node 102-1, may then transmit the CP content 216, and/or other CP content 217, via downstream bus links 106 to a CP-SDN receiver 206 (via the CP-SDN repeater 204-1). The node transceiver 120 of the CP-SDN receiver 206, which may act as a slave node 102-2, may provide the CP content 216 and/or the CP content 217 to the cryptographic logic 220 of the CP-SDN receiver 206, and the cryptographic logic 220 of the CP-SDN receiver 206 may decrypt the CP content and provide the decrypted CP content to an output device 214 (e.g., a set of headphones). In some embodiments, the CP-SDN repeater 204-1 may be part of a rear seat entertainment (RSE) system in a vehicle, the CP-SDN repeater 204-2 may be part of the head unit of the vehicle, and the CP-SDN receiver 206 may be another part of the RSE system of the vehicle.

Figure 22:
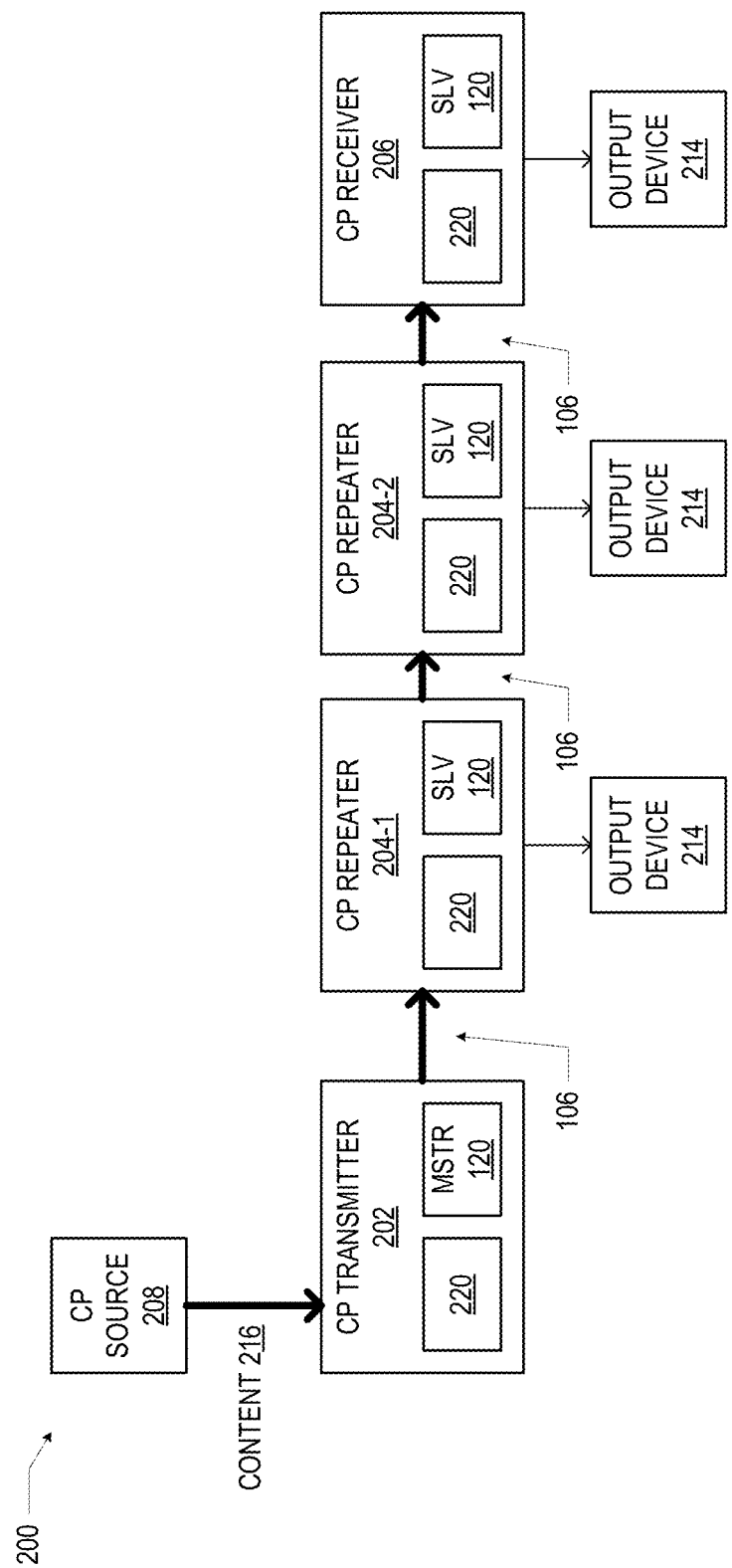

FIG. 22 illustrates another example system 200 in which CP content is transmitted over the bus 106. In the system 200 of FIG. 22, a CP source 208 (e.g., a Blu-ray player, a smart phone, or a streaming service) generates a CP content 216 (e.g., HDMI audio) and transmits the CP content 216 to a CP-SDN transmitter 202 (e.g., via an HDMI cable or wireless communication connection). The cryptographic logic 220 of the CP-SDN transmitter 202 may decrypt the CP content 216 and then reencrypt the decrypted CP content 216 and transmit the reencrypted CP content 216 (referred to below is simply "the CP content 216") to the node transceiver 120 of the CP-SDN transmitter 202. The node transceiver 120 of the CP-SDN transmitter 202, which may be configured to act as a master node 102-1, may then transmit the CP content 216 to a CP-SDN repeater 204-1 via a downstream link of the bus 106. The cryptographic logic 220 of the CP-SDN repeater 204-1 may decrypt the CP content 216 and then reencrypt the decrypted CP content 216 and transmit the reencrypted CP content 216 to the node transceiver 120 of the CP-SDN repeater 204-1. The CP-SDN repeater 204-1 may also be coupled to one or more output devices 214 (e.g., one or more speakers), and may transmit the decrypted CP content 216 to these local output devices 214. The node transceiver 120 of the CP-SDN repeater 204-1, which may be configured to act as a slave node 102-2, may then transmit the CP content 216 via a downstream bus link 106 to another CP-SDN repeater 204-2. The CP-SDN repeater 204-2 may operate in the same way described above with reference to the CP-SDN repeater 204-1, and in this manner, any number of CP-SDN repeaters 204 (with attendant output devices 214) may be joined along the bus 106. The system 200 may terminate with a CP-SDN receiver 206, which may operate in the same way described above with reference to the CP-SDN repeaters 204 except that the CP-SDN receiver 206 may "consume" the CP content 216 without putting it back on the bus 106 for upstream transmission. In some embodiments, when the output devices include one or more speakers, the system 200 may be used to provide a distributed amplification system. In a vehicle setting, a system 200 like the one of FIG. 22 may replace the need for a trunk amplifier by distributing audio output among multiple speakers.

Figure 23:
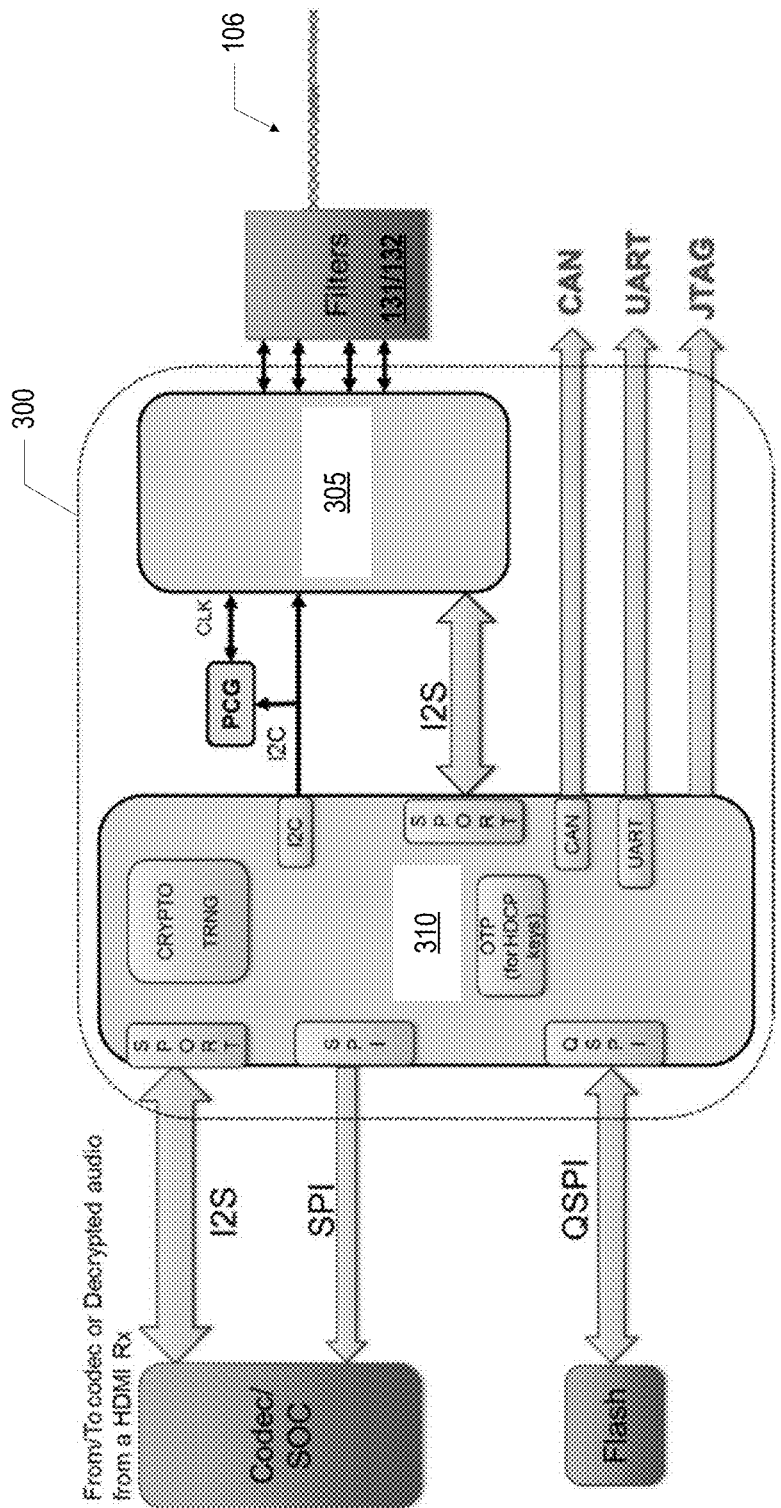
FIG. 23 illustrates a multi-chip package that may be used in a CP-SDN system, in accordance with various embodiments.

FIG. 23 illustrates an MCP 300 that includes both a node transceiver die 305 and a CP die 310 that includes the cryptographic logic 220 discussed herein. The MCP 300 may be a single integrated circuit package that can be mounted to a circuit board. The cryptographic logic 220 included in the CP die 310 may include a cryptographic engine and one-time programmable (OTP) memory to store secure keys (e.g., HDCP keys). In some embodiments, the CP die 310 may include a CAN interface, a Local Interconnect Network (LIN) interface, a Joint Test Action Group (JTAG) interface, and/or a Universal Asynchronous Receiver/Transmitter (UART) interface, which may be used for diagnostics. The CP die 310 may support any suitable content protection schemes, such as HDCP or DTCP, and may support other applications over a bus 106. The CP die 310 may communicate with a codec and/or a decrypted data source (e.g., audio or video output from a CP-SDN receiver) via a Synchronous Serial Peripheral Port (SPORT) interface and/or Serial Peripheral Interface (SPI). The CP die 310 may communicate with Flash memory via a Queued Serial Peripheral Interface (QSPI). The node transceiver die 305 may include the circuitry of the node transceiver 120 discussed herein, and may communicate with the CP die 310 via I2C and/or I2S. The node transceiver die 305 may interface with a link of the bus 106 via filtering circuitry 131/132, as discussed above.

FIG. 24 illustrates a frame format that may be used to achieve HDCP link synchronization and AKE in the systems 200 disclosed herein. For link synchronization, the format of FIG. 24 includes a frame sequence number, the most significant bit (MSB) and the least significant bit (LSB) of an input counter, and an indicator of encrypted status to indicate whether the data is encrypted or not. The entire link synchronization may be accommodated within eight bits so that the link synchronization will be compatible with 16-bit audio slots. For AKE, 8 bits of an asynchronous data pipe may be reserved, and periodic link integrity may be checked using the data pipe (e.g., periodic "alive" messages from a CP-SDN receiver 206 to a CP-SDN transmitter 202); data pipes are discussed in further detail below.

FIG. 25 illustrates a frame format that may be used to achieve DTCP link synchronization and AKE in the systems 200 disclosed herein. For link synchronization, the format of FIG. 25 includes a frame sequence number, and the MSB and the LSB of an input counter. The format of FIG. 25 also includes four bits of "DTCP Information," which may include an odd/even bit (bit 0), an encrypted mode indicator (EMI) (bits 1 and 2), and an "UpdateDTCPInfo" bit (bit 3) used to indicate to the receiver port that DTCP_USER_INFO has changed. The DTCP_USER_INFO includes the encrypted CI Plus and Usage Rules Information (CI+ URI), and detection of the "UpdateDTCPInfo" bit may trigger the CP-SDN receiver 206 to apply the latest CI+ URI information. Port maps may provide a register interface to read and/or write the DTCP_USER_INFO. On assertion of a "DTCP_APPLY" bit, the latest "EMI" and "USER_INFO" may be taken in by an audio management module and inserted into the link synchronization slot. The EMI information is unencrypted, while the USER_INFO information is encrypted, and may be decrypted using the same key as the CP content decryption. The entire link synchronization may be accommodated within eight bits so that the link synchronization will be compatible with 16-bit audio slots. For AKE, 8 bits of an asynchronous data pipe may be reserved, and periodic link integrity may be checked using this data pipe (e.g., periodic "alive" messages from a CP-SDN receiver 206 to a CP-SDN transmitter 202); data pipes are discussed in further detail below.

CP data may be received at a node transceiver 120 via by the I2S/TDM/PDM transceiver 127 (FIG. 2) (e.g., when the CP data is provided by a CP source 208). At that interface, the channel size may be 32 bits, and the AKE, link synchronization, and link integrity techniques discussed above may occupy the MSBs of the channel; the remaining bits may be 0.

When the node transceiver 120 is to receive or transmit CP data via the bus 106, the slot size may be configurable in registers of the node transceiver 120. The AKE, link synchronization, and link integrity techniques discussed above may occupy the MSBs of the slot. When the slot is a downstream slot, the remainder of the bits may be 0 when the slot size is greater than 16 bits (for HDCP) or greater than 24 bits (for DTCP). When the slot is an upstream slot, the remainder of the bits may be 0 when the slot size is greater than eight bits.

DTCP user information may be transmitted securely from a node transceiver 120 along the bus 106 in the link synchronization channel. The information may start as soon as a content key is exchanged between the CP-SDN transmitter 202 and the CP-SDN receiver 206. A user at the transmit end may write the CI+ URI information using the registers DTCP_USER_INFO1 through DTCP_USER_INFO8 of the transmit port map. One such writing is complete, the bit TSPORT_CTL2.DTCP_APPLY may be asserted, and afterwards, the updated CI+ URI information is encrypted using the current content key and transmitted securely to the CP-SDN receiver 206. As noted above, an "UpdateDTCPInfo" bit may be toggled in the link synchronization to indicate to the CP-SDN receiver 206 that the CI+ URI information has changed. The new settings may be read using the registers DTCP_USER_INFO1 through DTCP_USER_INFO8 of the receive port map, and then applied. FIG. 26 illustrates an example mapping from CI+ URI to USER_INFO bytes.

When implementing HDCP, a system 200 may perform locality checks in accordance with the HDCP specification. In some embodiments, a system 200 may always perform locality checks in which pre-compute is enabled. In some embodiments, a system 200 may not re-attempt locality checks without repeating AKE.

Figure 28:
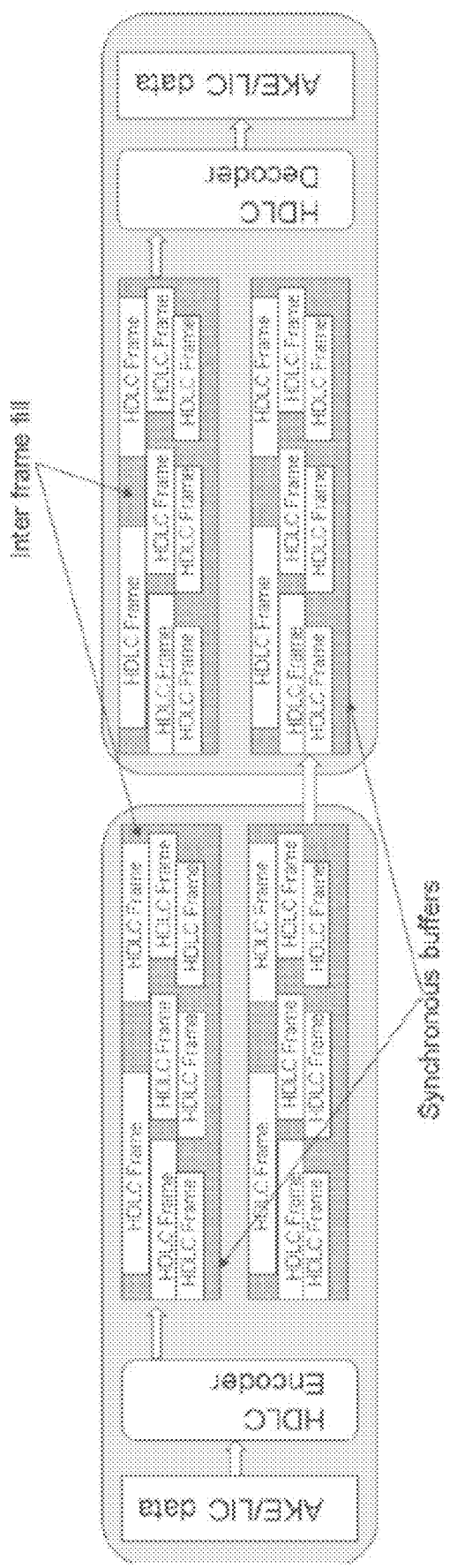

As noted above with reference to FIGS. 24 and 25, AKE may be performed using an asynchronous data pipe along the bus 106. As used herein, a "data pipe" may refer to an asynchronous message sent over the synchronous system 100. FIGS. 27 and 28 illustrate a data pipe implementation for the sending of AKE messages to support communication of CP content along the bus 106. A data pipe in the system 100 (as part of a CP-SDN system 200) may transport control data in the data slots, in addition to audio or other data, allowing for, e.g., asynchronous communication of control data using the mailbox techniques disclosed herein. A data pipe may use a High-Level Data Link Control (HDLC) framing format, which may be implemented in software at a byte level. This may be in contrast to conventional approaches, in which HDLC is implemented in Layer 2 (L2) hardware at a bit level.

The following paragraphs provide examples of various ones of the embodiments disclosed herein.

Example 1 is a device capable of providing digital content protection to data communicated from the device over a synchronous communication system, including: a transceiver to couple to a link of a two-wire bus of a synchronous communication system; and content protection circuitry to provide content protected data to the transceiver, wherein the transceiver is to transmit the content protected data synchronously over the link of the two-wire bus.

Example 2 includes the subject matter of Example 1, and further specifies that the transceiver is a first transceiver, the link is a first link, and the device further includes: a second transceiver to couple to a second link of a two-wire bus of a synchronous communication system.

Example 3 includes the subject matter of Example 2, and further specifies that the content protected data is first content protected data, the content protection circuitry is to provide second content protected data to the second transceiver, and the second transceiver is to transmit the second content protected data synchronously over the second link of the two-wire bus.

Example 4 includes the subject matter of Example 2, and further specifies that the content protected data is first content protected data, the content protection circuitry is to receive second content protected data from the second transceiver, and the second transceiver is to receive the second content protected data synchronously over the second link of the two-wire bus.

Example 5 includes the subject matter of Example 2, and further specifies that the first transceiver is an upstream transceiver, the first link is an upstream link, the second transceiver is an downstream transceiver, and the second link is a downstream link.

Example 6 includes the subject matter of Example 2, and further specifies that the device is a slave device of the synchronous communication system.

Example 7 includes the subject matter of Example 1, and further specifies that the device is a master device of the synchronous communication system.

Example 8 includes the subject matter of Example 7, and further specifies that the transceiver is a downstream transceiver and the link is a downstream link.

Example 9 includes the subject matter of Example 1, and further specifies that: the content protected data is first content protected data; the content protection circuitry to receive second content protected data from the transceiver; and the transceiver is to receive the second content protected data synchronously over the link of the two-wire bus.

Example 10 includes the subject matter of Example 9, and further includes: a peripheral device interface to couple to a peripheral device, wherein the content protection circuitry is to decrypt the second content protected data, and the peripheral device interface is to transmit the decrypted second content protected data to the peripheral device.

Example 11 includes the subject matter of Example 9, and further specifies that the transceiver is an upstream transceiver.

Example 12 includes the subject matter of Example 9, and further specifies that the transceiver is a downstream transceiver.

Example 13 includes the subject matter of Example 9, and further specifies that the device is a slave device of the synchronous communication system.

Example 14 includes the subject matter of Example 9, and further specifies that the device is a master device of the synchronous communication system.

Example 15 includes the subject matter of Example 1, and further specifies that the content protection circuitry is to decrypt the content protected data.

Example 16 includes the subject matter of Example 1, and further specifies that the content protection circuitry is to encrypt data to generate the content protected data.

Example 17 includes the subject matter of Example 1, and further specifies that the content protected data is protected in accordance with the High-Bandwidth Digital Content Protection (HDCP) specification or the Digital Transmission Content Protection (DTCP) specification.

Example 18 includes the subject matter of Example 1, and further specifies that data transmitted over the two-wire bus is Manchester encoded.

Example 19 includes the subject matter of Example 1, and further specifies that the device is to operate on power received over the two-wire bus.

Example 20 includes the subject matter of Example 1, and further specifies that the device is included in a trunk amplifier for a vehicle.

Example 21 includes the subject matter of Example 1, and further specifies that the device is included in a rear seat entertainment unit for a vehicle.

Example 22 includes the subject matter of Example 1, and further specifies that the device is included in a head unit of a vehicle.

Example 23 includes the subject matter of Example 1, and further specifies that the transceiver is included in a first die, and the content protection circuitry is included in a second die different from the first die.

Example 24 includes the subject matter of Example 23, and further specifies that the first die and the second die are included in a multi-chip package.

Example 25 includes the subject matter of Example 1, and further specifies that the transceiver is to transmit link synchronization information over the two-wire bus in a frame of data.

Example 26 includes the subject matter of Example 1, and further specifies that the transceiver is to transmit the content protected data over the two-wire bus in blocks of 16 frames.

Example 27 includes the subject matter of Example 1, and further includes: a host device interface to couple to a host device, wherein the host device interface is to receive data from the host device, and the content protection circuitry is to encrypt data received from the host device to generate content protected data.

Example 28. A device for use in a content protection synchronous communication system, including: a transceiver to couple to a link of a two-wire bus of a synchronous communication system, wherein the transceiver is to receive content protected data synchronously over the link of the two-wire bus; and content protection circuitry to receive content protected data from the transceiver.

Example 29 includes the subject matter of Example 28, and further specifies that the transceiver is a first transceiver, the link is a first link, and the device further includes: a second transceiver to couple to a second link of a two-wire bus of a synchronous communication system.

Example 30 includes the subject matter of Example 29, and further specifies that the content protected data is first content protected data, the second transceiver is to receive second content protected data synchronously over the second link of the two-wire bus, and the content protection circuitry is to receive the second content protected data from the second transceiver.

Example 31 includes the subject matter of Example 29, and further specifies that the content protected data is first content protected data, the content protection circuitry is to provide second content protected data to the second transceiver, and the second transceiver is to transmit the second content protected data synchronously over the second link of the two-wire bus.

Example 32 includes the subject matter of Example 29, and further specifies that the first transceiver is an upstream transceiver, the first link is an upstream link, the second transceiver is an downstream transceiver, and the second link is a downstream link.

Example 33 includes the subject matter of Example 29, and further specifies that the device is a slave device of the synchronous communication system.

Example 34 includes the subject matter of Example 28, and further specifies that the device is a master device of the synchronous communication system.

Example 35 includes the subject matter of Example 34, and further specifies that the transceiver is a downstream transceiver and the link is a downstream link.

Example 36 includes the subject matter of Example 28, and further specifies that: the content protected data is first content protected data; the content protection circuitry to provide second content protected data to the transceiver; and the transceiver is to transmit the second content protected data synchronously over the link of the two-wire bus.

Example 37 includes the subject matter of Example 36, and further specifies that the transceiver is an upstream transceiver.

Example 38 includes the subject matter of Example 36, and further specifies that the transceiver is a downstream transceiver.

Example 39 includes the subject matter of Example 36, and further specifies that the device is a slave device of the synchronous communication system.

Example 40 includes the subject matter of Example 36, and further specifies that the device is a master device of the synchronous communication system.

Example 41 includes the subject matter of Example 28, and further specifies that the content protection circuitry is to decrypt the content protected data.

Example 42 includes the subject matter of Example 28, and further specifies that the content protection circuitry is to encrypt data to generate the content protected data.

Example 43 includes the subject matter of Example 28, and further specifies that the content protected data is protected in accordance with the High-Bandwidth Digital Content Protection (HDCP) specification or the Digital Transmission Content Protection (DTCP) specification.

Example 44 includes the subject matter of Example 28, and further specifies that data transmitted over the two-wire bus is Manchester encoded.

Example 45 includes the subject matter of Example 28, and further specifies that the device is to operate on power received over the two-wire bus.

Example 46 includes the subject matter of Example 28, and further specifies that the device is included in a trunk amplifier for a vehicle.

Example 47 includes the subject matter of Example 28, and further specifies that the device is included in a rear seat entertainment unit for a vehicle.

Example 48 includes the subject matter of Example 28, and further specifies that the device is included in a head unit of a vehicle.

Example 49 includes the subject matter of Example 28, and further specifies that the transceiver is included in a first die, and the content protection circuitry is included in a second die different from the first die.

Example 50 includes the subject matter of Example 49, and further specifies that the first die and the second die are included in a multi-chip package.

Example 51 includes the subject matter of Example 28, and further specifies that the transceiver is to transmit link synchronization information over the two-wire bus in a frame of data.

Example 52 includes the subject matter of Example 28, and further specifies that the transceiver is to transmit the content protected data over the two-wire bus in blocks of 16 frames.

Example 53. A method of communicating content protected data, including: providing link synchronization information over a link of a synchronous bus; and providing content protected data over the link of the synchronous bus.

Example 54 includes the subject matter of Example 53, and further includes: before providing content protected data over the link of the synchronous bus, performing an authentication and key exchange with a receiving device.

Example 55 includes the subject matter of Example 53, and further specifies that the synchronous bus is a two-wire bus.

Example 56 includes the subject matter of Example 53, and further specifies that the content protected data is protected in accordance with the High-Bandwidth Digital Content Protection (HDCP) specification or the Digital Transmission Content Protection (DTCP) specification.

Example 57 includes the subject matter of Example 53, and further includes: receiving content protected data over the link of the synchronous bus.

Example 58 is a slave device capable of providing digital content protection to data communicated from the slave device over a synchronous communication system, including an upstream transceiver to couple to an upstream link of a two-wire bus of a synchronous communication system, and content protection circuitry to provide content protected data to the upstream transceiver, wherein the upstream transceiver is to transmit the content protected data synchronously over the upstream link of the two-wire bus.

Example 59 includes the subject matter of Example 58, and further specifies that the upstream transceiver is to receive content protected data synchronously over the upstream link of the two-wire bus.

Example 60 includes the subject matter of Example 59, and further specifies that the content protection circuitry is to decrypt the received content protected data.

Example 61 includes the subject matter of any of Examples 58-60, and further includes a downstream transceiver to couple to a downstream link of the two-wire bus of the synchronous communication system, wherein the content protection circuitry is to provide content protected data to the downstream transceiver, and the downstream transceiver is to transmit the content protected data synchronously over the downstream link of the two-wire bus.

Example 62 includes the subject matter of Example 61, and further specifies that the downstream transceiver is to receive content protected data synchronously over the downstream link of the bus.

Example 63 includes the subject matter of any of Examples 58-62, and further specifies that data transmitted over the two-wire bus is Manchester encoded.

Example 64 includes the subject matter of any of Examples 58-63, and further includes a peripheral device interface to couple to a peripheral device, wherein the content protection circuitry is to decrypt content protected data received at the slave device, and the peripheral device interface is to transmit the decrypted content protected data to the peripheral device.

Example 65 includes the subject matter of any of Examples 58-64, and further specifies that the slave node is to operate on power received over the bus.

Example 66 includes the subject matter of any of Examples 58-65, and further specifies that the slave device is included in a trunk amplifier for a vehicle.

Example 67 includes the subject matter of any of Examples 58-66, and further specifies that the slave device is included in a rear seat entertainment unit for a vehicle.

Example 68 is a master device capable of providing digital content protection to data communicated from the slave device over a synchronous communication system, including a downstream transceiver to couple to a downstream link of a two-wire bus of a synchronous communication system, and content protection circuitry to provide content protected data to the downstream transceiver, wherein the downstream transceiver is to transmit the content protected data synchronously over the downstream link of the two-wire bus.

Example 69 includes the subject matter of Example 68, and further specifies that the downstream transceiver is to receive content protected data synchronously over the downstream link of the two-wire bus.

Example 70 includes the subject matter of Example 69, and further specifies that the content protection circuitry is to decrypt the received content protected data.

Example 71 includes the subject matter of any of Examples 68-70, and further specifies that data transmitted over the two-wire bus is Manchester encoded.

Example 72 includes the subject matter of any of Examples 68-71, and further includes a host device interface to couple to a host device, wherein the host device interface is to transmit data to and/or from the host device, and the content protection circuitry is to encrypt data received from the host device to form content protected data.

Example 73 includes the subject matter of any of Examples 68-72, and further specifies that the master node is to provide power over the bus.

Example 74 includes the subject matter of any of Examples 68-73, and further specifies that the master node is included in a head unit for a vehicle.

Example 75 includes the subject matter of any of Examples 58-74, wherein the upstream or downstream transceiver is included in a first die, and the content protection circuitry is included in a second die different from the first die.

Example 76 includes the subject matter of Example 75, and further specifies that the first die and the second die are included in a multi-chip package.

Example 77 includes the subject matter of any of Examples 58-76, and further specifies that link synchronization information is transmitted over the two-wire bus in a frame of data.

Example 78 includes the subject matter of any of Examples 58-77, and further specifies that content protected data is transmitted over the two-wire bus in blocks of 16 frames.

Example 79 is a communication system with content protection functionality, including a master device in accordance with any suitable ones of the preceding Examples, a slave device in accordance with any suitable ones of the preceding Examples, and a two-wire bus link communicatively coupling the master device and the slave device.

Example 80 is a communication system with content protection functionality, in accordance with any of the embodiments disclosed herein.

Example 81 is a method of performing content protection in a synchronous communication system, in accordance with any of the embodiments disclosed herein.

Example 82 is a slave device including means for performing any of the content protection methods disclosed herein.

Example 83 is a master device including means for performing any of the content protection methods disclosed herein.

Example 84 includes any of the elements, or combination of elements, of the data pipes disclosed herein.

Example 85 includes the method of operation of any of the data pipes disclosed herein.

The invention claimed is:

1. A device capable of providing digital content protection to data communicated from the device over a synchronous, daisy-chained communication system, including:
    a first transceiver to couple to a first link of a two-wire bus of a synchronous, daisy-chained communication system, wherein the first transceiver is to provide power to the first link of the two-wire bus by providing a bias voltage on the first link of the two-wire bus;
    a second transceiver to couple to a second link of a two-wire bus of the synchronous, daisy-chained communication system, wherein the second link is different from the first link; and
    content protection circuitry to provide content-protected data to the first transceiver, wherein the first transceiver is to transmit the content-protected data synchronously over the first link of the two-wire bus.

2. The device of claim 1, wherein the first transceiver is an upstream transceiver, the first link is an upstream link, the second transceiver is a downstream transceiver, and the second link is a downstream link.

3. The device of claim 1, wherein the device is a slave device of the synchronous, daisy-chained communication system.

4. The device of claim 1, wherein the device is included in a trunk amplifier for a vehicle, in a rear seat entertainment unit for a vehicle, or in a head unit of a vehicle.

5. The device of claim 1, wherein the first transceiver is included in a first die, and the content protection circuitry is included in a second die different from the first die.

6. The device of claim 5, wherein the first die and the second die are included in a multi-chip package.

7. The device of claim 1, wherein the content-protected data is protected in accordance with the High-Bandwidth Digital Content Protection (HDCP) specification or the Digital Transmission Content Protection (DTCP) specification.

8. A device for use in a content-protection synchronous, daisy-chained communication system, including:
    a first transceiver to couple to a first link of a two-wire bus of a synchronous, daisy-chained communication system, wherein the first transceiver is to receive first content-protected data synchronously over the first link of the two-wire bus, wherein the first transceiver is to (1) receive power from the first link of the two-wire bus by receiving a bias voltage on the first link of the two-wire bus or (2) provide power to the first link of the two-wire bus by providing a bias voltage on the first link of the two-wire bus;
    a second transceiver to couple to a second link of a two-wire bus of the synchronous, daisy-chained communication system, wherein the second link is different from the first link; and
    content protection circuitry to receive first content-protected data from the first transceiver, wherein the content protection circuitry is to provide second content-protected data to the second transceiver, and the second transceiver is to transmit the second content-protected data synchronously over the second link of the two-wire bus.

9. The device of claim 8, wherein the content protection circuitry is, to generate the second content-protected data, to (1) decrypt the first content-protected data or (2) encrypt data.

10. The device of claim 8, wherein the first content-protected data is protected in accordance with the High- Bandwidth Digital Content Protection (HDCP) specification or the Digital Transmission Content Protection (DTCP) specification.

11. The device of claim 8, wherein the device is to operate on power received over the two-wire bus.

12. The device of claim 8, wherein the device is included in a trunk amplifier for a vehicle, in a rear seat entertainment unit for a vehicle, or in a head unit of a vehicle.

13. The device of claim 8, wherein the first transceiver is included in a first die, and the content protection circuitry is included in a second die different from the first die.

14. The device of claim 13, wherein the first die and the second die are included in a multi-chip package.

15. The device of claim 8, wherein the transceiver is to transmit link synchronization information over the two-wire bus in a frame of data.

16. A method of communicating content-protected data, comprising:
 receiving, at a first device, data from a second device over a first two-wire link of a daisy-chained communication system;
 providing, by the first device, link synchronization information to a third device over a second two-wire link of a daisy-chained communication system, wherein the first two-wire link is different from the second two-wire link; and
 providing, by the first device, power and content-protected data to the third device over the second two-wire link.

17. The method of claim 16, further comprising:
 before providing the content-protected data over the second two-wire link, performing an authentication and key exchange with the third device.

18. The method of claim 16, wherein the daisy-chained communication system is a synchronous communication system.

19. The method of claim 16, wherein the content-protected data is protected in accordance with the High-Bandwidth Digital Content Protection (HDCP) specification or the Digital Transmission Content Protection (DTCP) specification.

20. The method of claim 16, wherein the content-protected data is first content-protected data, and the method further includes:
 receiving second content-protected data from the third device over the second two-wire link.

* * * * *